United States Patent
Pehlert et al.

(10) Patent No.: US 7,511,104 B2
(45) Date of Patent: Mar. 31, 2009

(54) POLYOLEFINS MADE BY CATALYST COMPRISING A NONCOORDINATING ANION AND ARTICLES COMPRISING THEM

(75) Inventors: George James Pehlert, Houston, TX (US); Bruce A. Harrington, Houston, TX (US); George Rodriguez, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 592 days.

(21) Appl. No.: 10/481,521

(22) PCT Filed: May 16, 2002

(86) PCT No.: PCT/US02/18610

§ 371 (c)(1),
(2), (4) Date: Dec. 22, 2004

(87) PCT Pub. No.: WO03/000740

PCT Pub. Date: Jan. 3, 2003

(65) Prior Publication Data

US 2005/0123778 A1    Jun. 9, 2005

Related U.S. Application Data

(60) Provisional application No. 60/299,526, filed on Jun. 20, 2001.

(51) Int. Cl.
*C08F 4/42* (2006.01)

(52) U.S. Cl. .................. 526/160; 526/131; 526/134; 526/352; 526/348.6; 526/943

(58) Field of Classification Search ............... 526/160, 526/943, 131, 134, 352, 348.6
See application file for complete search history.

(56) References Cited

U.S. PATENT DOCUMENTS

| 4,946,899 | A | 8/1990 | Kennedy et al. | 525/244 |
|---|---|---|---|---|
| 5,198,401 | A | 3/1993 | Turner et al. | 502/155 |
| 5,229,478 | A | 7/1993 | Floyd et al. | 526/160 |
| 5,246,783 | A | 9/1993 | Spenadel et al. | 428/461 |
| 5,278,119 | A | 1/1994 | Turner et al. | 502/155 |
| 5,502,017 | A | 3/1996 | Marks et al. | 502/103 |
| 5,552,504 | A | 9/1996 | Bennett et al. | 526/348.1 |
| 5,731,082 | A | 3/1998 | Gross et al. | 428/379 |
| 5,837,939 | A | 11/1998 | Cieloszyk et al. | 174/110 PM |
| 5,919,565 | A * | 7/1999 | Gross | 428/379 |
| 6,232,377 | B1 | 5/2001 | Hayashi et al. | 524/100 |
| 6,258,904 | B1 | 7/2001 | Wasserman et al. | 526/160 |

FOREIGN PATENT DOCUMENTS

| EP | 0 277 003 | 8/1988 |
|---|---|---|
| EP | 0 277 004 | 8/1988 |
| EP | 0 735 059 | 10/1996 |
| WO | WO 91/07451 | 5/1991 |
| WO | WO 97/19959 | 6/1997 |
| WO | WO 99/06412 | 2/1999 |
| WO | WO 99/28353 | 6/1999 |
| WO | WO 00/26268 | 5/2000 |
| WO | WO 01/42249 | 6/2001 |
| WO | WO 01/46273 | 6/2001 |
| WO | WO 01/46273 A1 * | 6/2001 |

OTHER PUBLICATIONS

Quyoum et a.l, J. Am. Chem. Soc. 1994, 6435-6436 entitled "A Carbocationic Olefin Polymerization Initiator Masquerading as a Ziegler-Natta Catalyst".

* cited by examiner

*Primary Examiner*—Ling-Siu Choi

(57) ABSTRACT

Polymers made by transition metal catalyst systems comprising a bulky noncoordinating anion (NCA) as cocatalyst component. In comparison to polymers containing a conventional NCA, these polymers show a considerably lower dielectric loss, making them suitable for insulation applications such as for power cable.

5 Claims, 1 Drawing Sheet

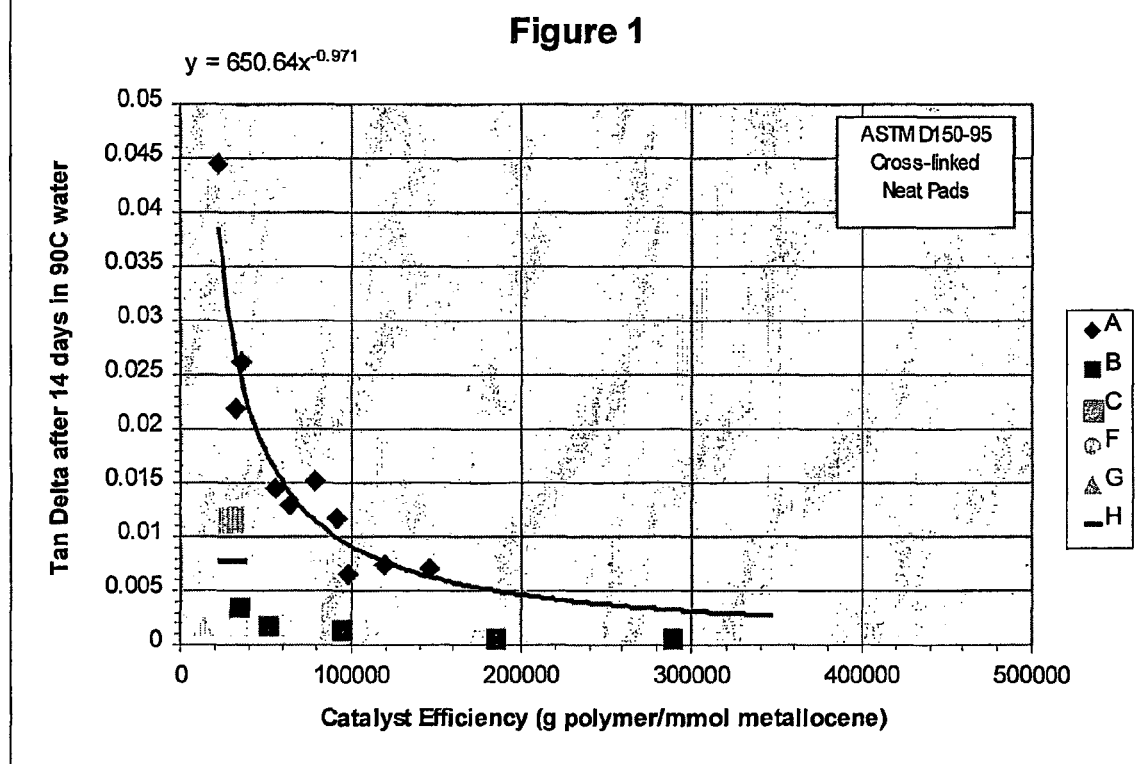

POLYOLEFINS MADE BY CATALYST COMPRISING A NONCOORDINATING ANION AND ARTICLES COMPRISING THEM

This application is the National Stage of International Application No. PCT/US02/18610, filed May 16, 2002, which claims the benefit of U.S. Provisional Application No. 60/299,526, filed Jun. 20, 2001, the entire disclosure of which is hereby incorporated herein by reference.

TECHNICAL FIELD

This invention relates to polyolefins made in the presence of a transition metal catalyst precursor activated by a noncoordinating anion (hereafter sometimes abbreviated as "NCA") for providing reduced dielectric loss. In particular, to articles of manufacture comprising an electrically conductive substrate and a polymeric insulation, the latter including the low dielectric loss polyolefin. The invention also relates to processes for making these polyolefins and to articles of manufacture.

DISCUSSION OF BACKGROUND

The term "noncoordinating anion" is now accepted terminology in the field of olefin and vinyl monomer polymerization to indicate an anion that stabilizes (stabilizing anion) a transition metal cation. This cation is generally accepted to be the active site in Ziegler-Natta catalysts. For example, the polymerization may be a coordination, insertion or carbocationic polymerization. See, e.g., EP 0 277 003, EP 0 277 004, U.S. Pat. Nos. 5,198,401 and 5,278,119, and Baird, Michael C., et al, J. Am. Chem. Soc. 1994, 116, 6435-6436, the disclosures of which are expressly incorporated herein by reference in their entireties for purposes of U.S. patent practice. NCAs are described to function as electronic stabilizing cocatalysts, or counterions, for essentially cationic metallocene complexes that are active for polymerization. The term "noncoordinating anion" as used herein applies both to truly noncoordinating anions and coordinating anions that are at most weakly coordinated to the cationic complex so as to be labile to replacement by olefinically or acetylenically unsaturated monomers at the insertion site.

In solid insulations, dielectric loss under alternating current (ac) field conditions commonly arises from relaxation processes associated with dipole orientation (polarization) and the movement of free charge carriers such as ions or electrons (conduction). The most commonly used parameter for expressing the dielectric loss of an insulator is the dissipation factor (tan δ). Dielectric tan δ, analagous to dynamic mechanical loss tan δ, is a measure of the ratio of the energy dissipated to the energy stored during a complete cycle of loading and unloading. However, in this case the load is an ac voltage rather than an oscillating mechanical strain. Ion conduction processes can lead to significant power losses in insulating materials if ionic charge carriers are present.

Electrical insulation applications are generally divided into low voltage insulation, which are those applications which generally involve less than 1,000 volts (1K volts), medium voltage insulation applications which generally range from 1,000 volts to 35,000 volts, and high voltage insulation applications, generally above 35,000 volts Typical power cables such as those made for medium voltage applications include one or more conductors in a core that is generally surrounded by several layers that can include a first polymeric semi-conducting shield layer, a polymeric insulating layer and a second polymeric semi-conducting shield layer, a metallic tape and a polymeric jacket. A wide variety of polymeric materials have been utilized as electrical insulating and semi-conducting shield materials for power cable (e.g., building wire, electric motor wire, machinery power wire, underground power transmitting cable, and the like) and numerous other electrical applications.

In elastomers or elastomer-like polymers often used as one or more of the polymer members in electrical devices such as, e.g., power cables, ethylene/alpha-olefin/non-conjugated diene elastic polymer materials that have come into wide use usually include ethylene, an α-olefin such as, e.g., propylene, and a non-conjugated diene such as, e.g., 5-ethylidene-2-norbornene (ENB), 1,4-hexadiene, 1,6-octadiene, 5-methyl-1,4-hexadiene, 3,7-dimethyl-1,6-octadiene, and the like. Such polymers made with conventional Ziegler-Natta catalysts usually provide a good insulating property for power cables.

In comparison to conventional Ziegler-Natta catalysts (such as those based on titanium and vanadium transition metal compounds), metallocene-based catalysts offer a number of advantages that would make the latter appear to be even more suitable for the production of polymers and in particular, polyolefins to be used for electrical devices than the former. For example, due to the usually much higher activity of metallocene-based catalysts, the polyolefin made therewith can be expected to contain much less catalyst (metal) residue ("ash") than a corresponding Ziegler-catalyzed polyolefin. This reduced ash content translates into a reduced number of metal ions in the final polymer that can contribute to electrical conductivity. Furthermore, in order to reduce the relatively high residual transition metal (e.g., Ti and/or V) content of Ziegler-catalyzed polymers, these polymers are often washed by slurrying them in a suitable aqueous liquid. To make this washing operation effective, slurrying aids such as calcium stearate are added to the aqueous liquid to keep agglomeration of polymer particles at a minimum. As a result thereof the washed polymer, while having a reduced transition metal content, contains ions derived from the slurrying aid (e.g., calcium ions) that adversely affect the insulating properties of the polymer.

Since metallocene-based catalysts overcome the above-discussed problems associated with the less active, conventional Ziegler-Natta catalysts, metallocene-catalyzed polyolefins would be expected to exhibit lower dielectric loss and, therefore, even better insulating property than polyolefins made by Ziegler catalysts. However, polyolefins made with catalysts derived from a metallocene catalyst precursor compound and a cocatalyst (activator) compound which includes a typically used NCA such as tetrakis(pentafluorophenyl) borate, $B(C_6F_5)_4^-$, show a higher dielectric loss than conventional Ziegler-Natta catalyzed polyolefins, making the former less suitable for electrical insulation purposes.

In the case of NCA-activated metallocene-catalyzed polyolefins ionic cocatalyst residues are known to be present in the polymers. These ions are believed to be major contributors to the high dielectric loss observed in these polymers. One way to avoid this problem in polymers to be used for electrical devices is to use metallocene cocatalysts that can easily be decomposed into uncharged species upon completion of the polymerization. A typical example of such a cocatalyst is an alumoxane such as methylalumoxane (MAO) which can easily be hydrolyzed to form methane and aluminum hydroxide (see, e.g., U.S. Pat. No. 5,246,783, incorporated herein by reference in its entirety for purposes of U.S. patent practice). However, while with an NCA such as $B(C_6F_5)_4^-$ the molar ratio of metallocene transition metal (e.g., Zr) to NCA can be kept close to 1:1, a relatively large excess of alumoxane Al over the metallocene transition metal (e.g., 10:1 and higher) is needed to achieve high catalyst activity, thereby increasing the amount of catalyst residue (in particular, Al) in the resulting polymer. One of the reasons for the lower amount of NCA needed to activate the metallocene in comparison to an alumoxane is believed to be that the NCA is a stoicheometric activator (1 mole NCA:1 mole metallocene). The stability of the NCA causes a problem after completion of the polymerization in that unlike an alumoxane, an NCA such as $B(C_6F_5)_4^-$ is very hard to decompose, i.e., it cannot easily be converted into uncharged species that do not compromise the electrical insulation properties of the polymer containing them.

It is thought that the presence of stable anions, even in very low concentrations, cause dielectric loss due to their high mobility within the polymer interfaces. In view of the foregoing, there is a need for an NCA cocatalyst that, while showing a high stability, does not later cause any significant conductivity problems in the finished polymer. It would, thus be desirable to have available polyolefins made by an unsupported, highly active NCA containing catalyst system (such as a metallocene-based catalyst system) which show a dielectric loss that is low enough (i.e., have a sufficiently low tan delta) for making them suitable for use in electrical devices, e.g., for power cable applications.

SUMMARY OF THE INVENTION

We have discovered that the dielectric loss properties of olefinic polymers made by catalyst systems comprising unsupported NCAs can be improved using selected NCAs, particularly those in which the shielding ligands are sufficiently bulky. Presumably, the bulky nature of these activators reduce their mobility and thereby reduce dielectric loss.

In one aspect, the invention provides an article of manufacture which comprises (i) an electrically conductive member comprising at least one electrically conductive substrate and (ii) at least one electrically insulating member comprising at least one polymer based on one or more monomers selected from monoolefins and diolefins. This polymer comprises a residue of a polymerization catalyst which comprises a non-polymeric NCA having at least 33 atoms Z that are different from H and F. ("Residue" in the present context means catalyst-derived material that is left behind in the finished polymer after polymerization and optional further processing).

The electrically conductive member usually comprises a metal conductor and is surrounded, at least in part, by the at least one electrically insulating member. Furthermore, the at least one polymer may be selected from homo- and copolymers of ethylene, and in one embodiment it comprises units derived from ethylene and at least one α-olefin having from 3 to 20 carbon atoms. In another embodiment the at least one polymer further comprises units derived from at least one diene having 4 to 20 atoms.

In still another aspect, the catalyst further comprises a transition metal complex that comprises a metallocene and sometimes the metallocene comprises Ti, Zr or Hf.

In a further aspect, the NCA comprises at least 37 atoms Z independently selected from Groups 3-17. In some embodiments, the NCA comprises not more than 180 atoms Z.

In another aspect, the atoms Z may independently be selected from B, Al, Ga, C, Si, Ge, N, P, O, Cl, Br, and elements of Groups 3-12. According to some embodiments, the atoms Z comprise C and at least one of B, Al, Si, N and P. Often at least 75% of the atoms Z will be carbon atoms.

In a further aspect, the NCA can comprise (a) one or more central core atoms of elements selected from Groups 3-12, 13, 14 and 15 and the lanthanides; and, directly or indirectly bonded thereto, (b) at least (33-m) atoms selected from atoms of one or more of Groups 13, 14, 15 and 16, chlorine, bromine and iodine, m being the number of central core atoms (a). ("Directly or indirectly bonded thereto" means that an atom (b) is directly bonded to a central core atom (a) through a covalent bond or that the atom (b) is bonded to a central core atom (a) through one or more other atoms (b) with covalent bonds between these atoms and between these atoms and the central core atom (a)). Some embodiments select the central core atom(s) of the NCA from B, Al, Si, and P.

In some embodiments of the present invention the NCA comprises at least one unit of general formula (I):

wherein M is an element selected from Groups 13-15 and $R^1$ and $R^2$ are independently selected from radicals comprising a ring system having at least 9 ring members; and radicals comprising a ring having 5 to 8 ring members and at least one substituent group comprising at least 5 atoms selected from carbon, nitrogen, oxygen, silicon, phosphorus, chlorine and bromine. $R^3$ to $R''$ are (is) independently selected from the above radicals for $R^1$ and $R^2$, halogen, and hydrocarbyl, while n equals the valence of M minus 1.

By way of non-limiting, illustrative example, M may be B, Al, Si, and P. In some embodiments, M is B or Al. Also, $R^3$ to $R''$ may independently be selected from the radicals given for $R^1$ and $R^2$, halogen, unsubstituted phenyl and halogen-substituted phenyl and at least three of $R^1$ to $R''$ may be identical. Examples of the ring system having at least 9 ring members are naphthyl, indenyl, fluorenyl, anthracyl, phenanthryl and azulyl, e.g., fluorinated naphthyl.

In yet another aspect, the ring comprising 5 to 8 ring members is selected from aromatic and heteroaromatic rings. For example, it may be fluorinated phenyl.

In some embodiments, the at least one substituent group for the ring comprising 5 to 8 members comprises at least 6 atoms selected from C, N, O, Si, and Cl. Illustratively, this substituent group may comprise a fluorinated phenyl group.

According to some aspects, the present invention provides an electrical cable, such as a medium voltage cable, which comprises an electrical conductor and at least one electrically insulating member, the at least one electrically insulating member comprising at least one polyolefin comprising ethylene units and prepared by a catalyst comprising a cationic metallocene species and an NCA, the NCA having at least 33 atoms Z that are different from hydrogen and fluorine atoms and comprising at least one unit of general formula (II):

wherein $Ar^1$ to $Ar^3$ are aryl radicals. At least two of the aryl radicals are selected from (i) fused aromatic ring systems having at least 10 carbon atoms; and (ii) phenyl groups having at least one substituent selected from phenyl groups, naphthyl groups, hydrocarbylsilyl groups and moieties comprising at least one of these groups.

In some embodiments, the NCA is of the general formula (III):

wherein $Ar^4$ has the same meanings given for $Ar^{1-3}$.

According to another aspect, the cable is a medium voltage cable.

In another aspect, all of $Ar^1$ to $Ar^4$ are selected from the above fused aromatic ring systems and the above phenyl groups. Also, in some embodiments, $Ar^1$ to $Ar^4$ are identical and fluorinated. Further, at least two of these or other embodiments, $Ar^1$ to $Ar^3$ are selected from naphthyl, anthracyl and phenanthryl. Still further, these or other embodiments all of $Ar^1$ to $Ar^4$ may be perfluorinated fused aromatic ring systems.

Some embodiments select triarylsilyl and trialkylsilyl groups as the hydrocarbylsilyl groups.

According to another aspect, the above moieties (ii) which comprise at least one of a phenyl group, naphthyl group and hydrocarbylsilyl group are selected from aryloxy; aryloxyalkyl; arylalkoxy; aryl-trihydrocarbylsilylalkyl; N-alkyl-N-arylamino; N-trihydrocarbylsilyl-N-arylamino; N-alkyl-N-trihydocarbylsilylamino; diarylamino; bis(trihydrocarbylsilyl)amino; aryloxyaryl; aryloxyalkaryl; arylalkoxyaryl; (aryl-trihydrocarbylsilylalkyl)aryl; (N-alkyl-N-arylamino)aryl; (N-trihydrocarbylsilyl-N-arylamino)aryl; (N-alkyl-N-trihydocarbylsilylamino)aryl; diarylaminoaryl; and [bis(trihydrocarbylsilyl)]aminoaryl; and, in particular, from phenoxy; naphthoxy; phenoxyalkyl; naphthoxyalkyl; phenylalkoxy; phenyltrihydrocarbylsilylalkyl; N-alkyl-N-phenylamino; N-trihydrocarbylsilyl-N-phenylamino; N-alkyl-N-trihydocarbylsilylamino; diphenylamino; bis(trihydrocarbylsilyl)amino; N-naphthyl-N-trihydrocarbylsilylamino; phenoxyphenyl; naphthoxyphenyl; phenoxyalkylphenyl; naphthoxyalkylphenyl; phenylalkoxyphenyl; (phenyltrihydrocarbylsilylalkyl)phenyl; (N-alkyl-N-phenylamino)-phenyl; (N-trihydrocarbylsilyl-N-phenylamino)phenyl; (N-alkyl-N-trihydocarbylsilylamino)phenyl; diphenylaminophenyl; [bis(trihydrocarbylsilyl)-amino]phenyl and (N-naphthyl-N-trihydrocarbylsilylamino)phenyl.

Some embodiments select the moieties (ii) from phenyl group, naphthyl and hydrocarbylsilyl fluorophenoxy; fluoronaphthoxy; fluoronaphthoxyalkyl; fluorophenoxyalkyl; fluorophenylalkoxy; fluorophenyl-trialkylsilylalkyl; N-alkyl-N-fluorophenylamino; N-trialkylsilyl-N-fluorophenylamino; N-alkyl-N-trialkylsilylamino; bis(fluorophenyl) amino; bis(trialkylsilyl)amino; N-fluoronaphthyl-N-trialkylsilylamino; fluorophenoxy-fluorophenyl; fluoronaphthoxyfluorophenyl; (fluoronaphthoxyalkyl)-fluorophenyl; (fluorophenoxyalkyl)fluorophenyl; (fluorophenylalkoxy)fluorophenyl; (fluorophenyl-trialkylsilylalkyl)fluorophenyl; (N-alkyl-N-fluorophenylamino)fluoro-phenyl; (N-trialkylsilyl-N-fluorophenylamino)fluorophenyl; (N-alkyl-N-trialkylsilyl-amino)fluorophenyl; [bis(fluorophenyl)amino]fluorophenyl; [bis(trialkylsilyl)-amino] fluorophenyl and (N-fluoronaphthyl-N-trialkylsilylamino) fluorophenyl.

In some embodiments for example, $Ar^1$ to $Ar^4$ is selected from perfluoronaphthyl; perfluorodiphenyl; N-perfluorophenyl-N-tri($C_1$-$C_8$alkyl)silylaminotetrafluorophenyl; tris-($C_3$-$C_8$alkyl)siloxy-tetrafluorophenyl; bis(perfluorophenyl) fluoromethyltetrafluoro-phenyl; (perfluoronaphthyl) perfluorophenyl; (perfluorodiphenyl)perfluorophenyl; [N-perfluoro-phenyl-N-tri($C_1$-$C_8$alkyl)silylamino-tetrafluorophenyl]perfluorophenyl; [tris($C_3$-$C_8$alkyl)-siloxytetrafluorophenyl]perfluorophenyl; and [bis(perfluorophenyl)fluoromethyl-tetrafluorophenyl]perfluorophenyl, such as, e.g., perfluoro-1-naphthyl; perfluoro-2-naphthyl; perfluoro-p-diphenyl; 4-(N-perfluorophenyl-N-trimethylsilylamino)-tetrafluorophenyl; 4-(N-perfluorophenyl-N-triethylsilylamino) tetrafluorophenyl; 4-triiso-propylsiloxytetrafluorophenyl; and 4-bis(perfluorophenyl)fluoromethyltetrafluorophenyl.

In one aspect, this invention relates to a method of improving the dielectric loss properties of an insulating member of a cable by reducing the concentration of the anion in the insulating member. The anion concentration can be reduced through higher polymerization activity, and thus tan delta is a function of polymerization activity. FIG. 1 defines the present art of tan delta as a function of polymerization activity (anion concentration) using activator A (see Table 10). The relationship is a power law function where x=polymerization activity in grams polymer/mmole metallocene and tan delta (y)=650.64$x^{-0.971}$ where x=the polymerization activity in grams polymer/mmole transition metal catalyst, after 14 days in water at 90° C. (ASTM D-150-95). The present invention provides a method for producing electrical cables having an insulating member with ionic residue and having dielectric tan delta value after 14 days in water at 90° C. (ASTM D-150-95) that is less than that described for the present art using the above equation. In some embodiments, the electrically insulating member of the above cable has a dielectric tan delta after 14 days in water at 90° C. of less than 0.02 (ASTM D 150-95).

According to another aspect, the present invention provides a method of improving the dielectric loss properties of a polymer made by contacting one or more olefinic monomers under polymerization conditions with a transition metal catalyst comprising an NCA. The method comprises using as the NCA an anion having at least 33 atoms Z independently selected from B, Al, Ga, C, Si, Ge, N, P, O, Cl, Br, and elements of Groups 3-12.

In some embodiments, the polymer is an ethylene-based polymer. Illustratively, the polymer may be a polyethylene homopolymer or copolymer, EPM or EPDM.

According to still another aspect, the atoms Z of the NCA comprise at least boron and carbon. In these or other embodiments, the NCA of the above catalyst has a molecular weight of at least 900. The catalyst may further comprise a metallocene complex, e.g., a metallocene complex of zirconium or hafnium.

The present invention also provides a process for making an electrical cable. According to this process, an electrically conductive member comprising a metal conductor (strand) is surrounded with at least one electrically insulating member comprising at least 20 weight-% of at least one polymer ethylene and one or more olefins selected from α-olefins having from 3 to 20 carbon atoms and optionally non-conjugated dienes having from 4 to 20 carbon atoms. This polymer has been prepared in the presence of a metallocene-based catalyst that comprises an NCA, the NCA comprising at least one unit of general formula (I):

$$-MR^1R^2R^3 \qquad (I)$$

wherein M is B or Al and $R^1$ to $R^3$ are independently selected from fused aromatic ring systems having at least 10 ring members; and phenyl groups having at least one substituent group comprising at least 9 atoms selected from carbon, nitrogen, oxygen, silicon and chlorine.

Also provided by the present invention is a process for making a polyolefin suitable for use in an electrically insulating composition by polymerizing one or more olefins in the presence of a transition metal catalyst, this process comprising the use of a catalyst including a cationic metallocene species and an NCA of the general formula (III):

$$[BAr^1Ar^2Ar^3Ar^4]^1 \qquad (III)$$

$Ar^1$ to $Ar^4$ in the above formula are aryl radicals and at least three of these aryl radicals are selected from fused aromatic ring systems having 10 to 30 ring members or phenyl groups having at least one substituent selected from phenyl groups, naphthyl groups, trialkylsilyl groups and moieties comprising at least one of these groups.

A composition suitable for electrical insulation purposes constitutes another aspect of the present invention. The composition comprises at least 30% by weight, based on the composition, of at least one polymer containing a catalyst residue comprising an NCA, and shows a dielectric tan delta after 14 days in water at 90° C. of less than 0.015, in some embodiments, less than 0.013 (ASTM D 150-95).

In one aspect, the composition comprises at least 50% by weight of the at least one polymer comprising an NCA. Also, it may comprise at least one further polymer not including an NCA.

Still further, the present invention provides an olefinic polymer containing a transition metal catalyst residue comprising an NCA and having dielectric tan delta values less than those of the present art as described by the equation; tan delta=$650.64x^{-0.971}$, where x=the polymerization activity in grams polymer/mmole transition metal catalyst, after 14 days in water at 90° C. (ASTM D-150-95). Still further, the present invention provides an olefinic polymer containing a transition metal catalyst residue comprising an NCA and showing a dielectric tan delta after 14 days in water at 90° C. of less than 0.02 (ASTM D 150-95), based on a catalyst efficiency of 10,000 g polymer/mmol transition metal.

BRIEF DESCRIPTION OF THE DRAWINGS

FIG. 1 is a graph showing dielectric loss (tan delta) as a function of catalyst efficiency for polymers made with different catalysts and activators as defined in Table 10.

DETAILED DESCRIPTION OF THE INVENTION

In the following detailed description and above, whenever reference is made to the following terms, these terms have the meanings given hereafter, unless indicated otherwise.

"Hydrocarbyl" encompasses optionally substituted (linear or branched) $C_{1-20}$ (preferably $C_{1-12}$) alkyl, $C_{2-20}$ (preferably $C_{2-12}$) alkenyl, $C_{2-20}$ (preferably $C_{2-12}$) alkynyl, $C_{7-20}$ (preferably $C_{7-12}$) arylalkyl and $C_{3-10}$ (preferably $C_{3-8}$) cycloalkyl and cycloalkenyl groups, as well as optionally substituted $C_{6-20}$ (preferably $C_{6-12}$) aryl and $C_{7-20}$ (preferably $C_{7-12}$) alkylaryl groups. Specific examples of theses groups are methyl, ethyl, n-propyl, isopropyl, n-, iso-, sec- and tert-butyl, pentyl, hexyl, heptyl, octyl, nonyl, decyl, undecyl, dodecyl, vinyl, propenyl, butenyl, ethynyl, cyclopropyl, cyclobutyl, cyclopentyl, cyclohexyl, cyclohexenyl, cyclohexadienyl, cyclooctyl, cyclooctenyl, benzyl, phenethyl, tolyl, xylyl, phenyl, naphthyl, anthracyl, phenanthryl, azulyl and biphenylyl groups. Typical substituents for the above groups are halogen (F, Cl, Br and I), $C_{1-8}$alkoxy (e.g., methoxy, ethoxy etc.) and di($C_{1-8}$ alkyl)amino (e.g., dimethylamino and diethylamino) groups. Moreover, one or more carbon atoms of the hydrocarbyl group may be replaced by a heteroatom such as, e.g., O, N, S and Si.

"Alkyl" refers to substituted and unsubstituted (linear or branched) $C_{1-20}$ (alternatively $C_{1-12}$) alkyl, $C_{7-20}$ (alternatively $C_{7-12}$) arylalkyl and $C_{3-10}$ (alternatively $C_{3-8}$) cycloalkyl groups.

"Alkoxy" means the above "alkyl" groups bonded to an oxygen atom.

"Aryl" refers to substituted and unsubstituted $C_{6-20}$ (alternatively $C_{6-12}$) aryl and $C_{7-20}$ (alternatively $C_{7-12}$) alkylaryl groups.

Moreover, whenever a "fluorinated aryl" group, "fluorinated alkyl group", "fluorophenyl", "fluoronaphthyl" etc. is recited, both a partially and a completely fluorinated group are intended. For example, "fluorophenyl" encompasses the various isomeric monofluorophenyl, difluorophenyl, trifluorophenyl and tetrafluorophenyl groups as well as pentafluorophenyl.

"Polymer" includes both homopolymer and copolymer.

"Copolymer" denotes a polymer that is derived from at least two (e.g., two, three or four) different monomers (e.g, monoolefins and/or diolefins).

"Optionally substituted" means both unsubstituted and substituted.

"Non-polymeric" in connection with the NCAs of the present invention means that if these NCAs are constituted by a sequence of identical structural units linked to each other one by one (i.e., a sequence of repeating units), the number of these structural units is not higher than 4, preferably not higher than 3, most preferred not higher than 2. This definition does, however, not exclude NCAs which comprise more than four identical structural units not directly linked to each other in a sequential manner. For example, more than four identical structural units may be linked to one and the same central atom (hub) or two central atoms may be linked to a total of more than four identical structural units.

Olefinic polymers contemplated for use in the present invention are polymers conventionally used in compounds for insulation purposes in electrical devices such as, e.g., the elastomers and elastomer-like polymers frequently used in power cable applications. For example, for medium voltage applications, polymers used for common electrically insulating and/or semiconducting compounds include ethylene homopolymers and copolymers of ethylene and at least one other olefinic compound, such as, e.g., an olefin (alternatively an α-olefin) containing 3 to 20, preferably, 3 to 16, most preferred 3 to 8 carbon atoms (e.g., propylene, butene-1, isobutylene pentene-1, 4-methyl-1-pentene, hexene-1,2-ethyl-1-hexene, octene-1, styrene, norbornene and dodecene-1) and/or a polyene having at least 4, alternatively at least 6, and not more than 20, alternatively not more than 15 carbon atoms. In some embodiments, the polyene is a straight chain, branched chain or cyclic hydrocarbon diene. In these or other embodiments, the diene is a non-conjugated diene. Examples of suitable dienes are straight chain acyclic dienes such as 1,3-butadiene, 1,4-hexadiene and 1,6-octadiene; branched chain acyclic dienes such as 5-methyl-1,4-hexadiene, 3,7-dimethyl-1,6-octadiene, 3,7-dimethyl-1,7-octadiene and mixed isomers of dihydromyrcene and dihydroocinene; single ring alicyclic dienes such as 1,3-cyclopentadiene, 1,4-cylcohexadiene, 1,5-cyclooctadiene and 1,5-cyclododecadiene; and multi-ring alicyclic fused and bridged ring dienes such as tetrahydroindene, methyltetrahydroindene, dicylcopentadiene, bicyclo-(2,2,1)-hepta-2-5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene. The dienes most frequently used include 1,4-hexadiene, 5-ethylidene-2-norbornene, 5-vinylidene-2-norbornene, 5-methylene-2-norbornene and dicyclopentadiene. The polyene (diene) is usually used for crosslinking the polymer and to increase polymer temperature resistance.

Corresponding polymers include the well known EPDM (Ethylene Propylene Diene Monomer) and EPM elastomeric materials. Other examples of suitable polyolefins are VLDPE (Very Low Density Polyethylene), LDPE (Low Density Polyethylene), LLDPE (Linear Low Density Polyethylene), HDPE (High Density Polyethylene), plastomers, etc.

Typical examples of copolymers used for the present invention's articles of manufacture (e.g., electrical devices)

include ethylene/alpha-olefin copolymers and ethylene/alpha-olefin/diene terpolymers. Illustrative, non-limiting examples of suitable copolymers are ethylene/butene-1, ethylene/hexene-1, ethylene/octene-1, and ethylene/propylene copolymers. Suitable examples of terpolymers include ethylene/propylene/1,4-hexadiene ethylene/butene-1/1,4-hexadiene, ethylene/octene-1/1,4-hexadiene, vinylnorbornadiene and ethylenenorbornadiene.

NCA-containing catalysts suitable for making polymeric materials of the type mentioned above generally are made by combining a transition metal catalyst precursor compound and an ionic cocatalyst compound composed of an NCA and an inorganic or (alternatively) organic cation (but a neutral precursor compound of an NCA is sometimes used).

Suitable transition metal catalyst precursor compounds include the metallocene compounds known to be useful in coordination polymerization, provided they are activable by the NCA-containing cocatalyst compound. These metallocene compounds typically include Group 3-10 transition metal, preferably Group 4 transition metal compounds, wherein at least one metal ligand can be abstracted by the cocatalyst precursor compound. Such ligands include hydride, hydrocarbyl (e.g., alkyl, alkenyl, etc.) and hydrocarbylsilyl. Specific examples include hydride, methyl, benzyl, dimethylbutadiene, etc. Ligands capable of being abstracted and transition metal compounds comprising them include those metallocenes described in, for example, U.S. Pat. No. 5,198,401 and WO 92/00333. Syntheses of these compounds are well known from the published literature. Additionally, where the metal ligands include halogen, amido or alkoxy labile ligands (as, for example, in the case of biscyclopentadienyl zirconium dichloride) that do not allow for ready abstraction with the activating cocatalyst compounds, they can be converted into suitable ligands via known alkylation reactions with organometallic compounds such as lithium or aluminum hydrides or alkyls, alkylalumoxanes, Grignard reagents, etc. See also EP 0 500 944 and EP 0 570 982 for the reaction of organoaluminum compounds with dihalo-substituted metallocene compounds prior to addition of activating anion compounds.

Additional descriptions of metallocene compounds which comprise, or can be alkylated to comprise, at least one ligand capable of abstraction to form a catalytically active transition metal cation appear in the patent literature, e.g., EP-A-0 129 368, U.S. Pat. Nos. 4,871,705, 4,937,299, 5,324,800 EP-A-0 418 044, EP-A-0 591 756, WO-A-92/00333, WO-A-94/01471 and WO 97/22635. Such metallocene compounds can be described for this invention as mono- or biscyclopentadienyl substituted Group 3, 4, 5, or 6 transition metal compounds wherein the ancillary ligands may be themselves substituted with one or more groups and may be bridged to each other, or may be bridged through a heteroatom to the transition metal. The size and constituency of the ancillary ligands and bridging elements are not critical to the preparation of the ionic catalyst systems and may be selected in the literature described manner to enhance the polymerization activity and polymer characteristics being sought. In some embodiments, the cyclopentadienyl rings (including substituted cyclopentadienyl-based fused ring systems, such as indenyl, fluorenyl, azulyl, or substituted analogs of them), when bridged to each other, will be lower alkyl-substituted ($C_1$-$C_6$) in the 2 position (without or without a similar 4-position substituent in the fused ring systems) and may additionally comprise alkyl, cycloalkyl, aryl, alkylaryl and or arylalkyl substituents, the latter as linear, branched or cyclic structures including multi-ring structures, for example, those of U.S. Pat. Nos. 5,278,264 and 5,304,614. Such substituents should each have essentially hydrocarbyl characteristics and will typically contain up to 30 carbon atoms but may be heteroatom containing with 1-5 non-hydrogen/carbon atoms, e.g., N, S, O, P, Ge, B and Si. The disclosures of all of the above documents are expressly incorporated herein by reference in their entireties for purposes of U.S. patent practice.

Metallocene compounds suitable for the preparation of linear polyethylene or ethylene-containing copolymers (where copolymer means comprising at least two different monomers) are essentially any of those known in the art, see again WO-A-92/00333 and U.S. Pat. Nos. 5,001,205; 5,198,401; 5,324,800; 5,304,614; and 5,308,816, for specific listings. Selection of metallocene compounds for use to make isotactic or syndiotactic polypropylene, and their syntheses, are well-known in the art, specific reference may be made to both patent literature and academic, see for example *Journal of Organometallic Chemistry* 369, 359-370 (1989). Typically those catalysts are stereorigid asymmetric, chiral or bridged chiral metallocenes. See, for example, U.S. Pat. Nos. 4,892,851; 5,017,714; 5,296,434; 5,278,264; WO-A-(PCT/US92/10066) WO-A-93/19103, EP-A2-0 577 581, EP-A1-0 578 838, and Spaleck, W., et al, "The Influence of Aromatic Substituents on the Polymerization Behavior of Bridged Zirconocene Catalysts", Organometallics 1994, 13, 954-963; Brinzinger, H., et al, "ansa-Zirconocene Polymerization Catalysts with Annelated Ring Ligands-Effects on Catalytic Activity and Polymer Chain Lengths", Organometallics 1994, 13, 964-970; and documents referred to therein. Though many of the above documents are directed to catalyst systems with alumoxane activators, the analogous metallocene compounds will be useful with NCA cocatalyst compounds for active coordination catalyst systems, when the halogen, amide or alkoxy containing ligands of the metals (where occurring) are replaced with ligands capable of abstraction, for example, via an alkylation reaction as described above, and another is a group into which the ethylene group —C═C— may insert, for example, hydride, alkyl, alkenyl, or silyl. See additional description in G. G. Hlatky, "Metallocene catalysts for olefin polymerization Annual review of 1996", Coordination Chemistry Reviews, 181, 243-296 (Elsevier Science, 1999).

Representative metallocene compounds can have the formula:

wherein Mc is a Group 3-6 metal; $L^A$ is a substituted or unsubstituted cyclopentadienyl or heterocyclopentadienyl ligand to Mc; $L^B$ is a member of the class of ligands defined for $L^A$, or is J, a heteroatom ligand connected to Mc; the $L^A$ and $L^B$ ligands may bridge together through one or more Group 13-16 element-containing linking groups; $L^C_i$ is an optional neutral, non-oxidizing ligand connected to Mc (i equals 0 to 3); and, D and E are independently labile ligands, each having a scissile metal-carbon connection to Mc, optionally bridged to each other or $L^A$ or $L^B$, that can be broken for abstraction purposes by a suitable activator and into which a polymerizable monomer or macromonomer can insert for coordination polymerization. Also, the use of hetero-atom containing rings or fused rings, where a non-carbon Group 13, 14, 15 or 16 atom replaces one of the ring carbons is considered for this specification to be within the terms "cyclopentadienyl", "indenyl", and "fluorenyl". See, for example, the background and teachings of WO 98/37106, having common priority with U.S. Ser. No. 08/999,214, filed Dec. 29, 1997, and WO 98/41530, having common priority with U.S. Ser. No. 09/042,378, filed Mar. 13, 1998.

Substituted cyclopentadienyl structures means that one or more hydrogen atoms are replaced with hydrocarbyl, hydrocarbylsilyl, or similar heteroatom-containing structures. The hydrocarbyl structures specifically include $C_1$-$C_{30}$ linear, branched, cyclic alkyl and cycloaromatic fused and pendant rings. These rings may also be substituted with similar structures.

Non-limiting representative metallocene compounds for use in combination with NCA-containing cocatalyst compounds include mono-cyclopentadienyl compounds such as pentamethylcyclopentadienyltitanium trisisopropoxide, pentamethylcyclo-pentadienyl tribenzyltitanium, dimethylsilyltetramethyl-cyclopentadienyl-tert-butylamidotitanium dichloride, pentamethylcyclopentadienyltitanium trimethyl, dimethylsilyltetramethylcyclopentadienyl-tert-butylamidozirconium dimethyl, dimethylsilyltetra-methylcyclopentadienyl-dodecylamidohafnium dihydride, dimethylsilyltetramethylcyclo-pentadienyl-dodecylamidohafnium dimethyl, unbridged biscyclopentadienyl compounds such as bis(1,3-butyl, methylcyclopentadienyl) zirconium dimethyl, pentamethylcyclopentadienyl-cyclopentadienyl zirconium dimethyl, (tetramethylcyclopentadienyl)(n-propylcyclopentadienyl)zirconium dimethyl; bridged biscyclopentadienyl compounds such as dimethylsilylbis (tetrahydroindenyl) zirconium dichloride and silacyclobutyl (tetramethylcyclopentadienyl)(n-propyl-cyclopentadienyl) zirconium dimethyl; bridged bisindenyl compounds such as dimethylsilylbisindenyl zirconium dichloride, dimethylsilylbisindenyl hafnium dimethyl, dimethylsilylbis(2-methylbenzindenyl) zirconium dichloride, dimethylsilylbis(2-methylbenzindenyl) zirconium dimethyl; and fluorenyl ligand-containing compounds, e.g., diphenylmethyl(fluorenyl)(cyclopentadienyl)zirconium dimethyl; and the additional mono- and biscyclopentadienyl compounds such as those listed and described in U.S. Pat. Nos. 5,017,714, 5,324,800, WO 92/00333 and EP-A-0 591 756. Particular advantage in solution polymerization can be achieved by the use of aliphatic solvent-soluble precursor compounds, e.g., bis(para-triethylsilyl-phenyl) methylene (2,7-(di-tert-butyl) fluorenyl) (cyclopentadienyl) hafnium dimethyl.

Representative traditional Ziegler-Natta transition metal compounds which can be used as catalyst precursor compounds in combination with cocatalyst compounds comprising an NCA include tetrabenzyl zirconium, tetra bis(trimethylsilylmethyl) zirconium, oxotris(trimethylsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction and that ligand into which the olefinically unsaturated group of the monomer can be inserted. These features enable the ligand abstraction from the transition metal compound and the concomitant formation of an ionic catalyst composition suitable for purposes of the present invention.

Additional organometallic transition metal compounds suitable as olefin polymerization catalyst precursor compounds in accordance with the invention will be any of those Group 3-10 transition metal compounds that can be converted by ligand abstraction or σ-bond scission into a catalytically active cation and stabilized in that active electronic state by a noncoordinating or weakly coordinating anion sufficiently labile to be displaced by an olefinically unsaturated monomer such as ethylene.

Exemplary compounds include those described in the patent literature. International patent publications WO 96/23010, WO 97/48735 and Gibson, et. al., Chem. Comm., pp. 849-850 (1998), disclose diimine-based ligands for Group 8-10 metal compounds shown to be suitable for ionic activation and olefin polymerization. See also WO 97/48735. Transition metal polymerization catalyst systems derived from Group 5-10 metals wherein the active transition metal center is in a high oxidation state and stabilized by low coordination number polyanionic ancillary ligand systems are described in U.S. Pat. Nos. 5,502,124 and 5,504,049. See also the Group 5 organometallic catalyst compounds of U.S. Pat. No. 5,851,945 and the tridentate ligand containing Group 5-10 organometallic catalyst compounds of copending U.S. patent application Ser. No. 09/302,243, filed 29 Apr. 1999, and its equivalent PCT/US99/09306. Group 11 catalyst precursor compounds, capable of activation with ionizing cocatalysts, useful for olefins and vinyl group-containing polar monomers are described and exemplified in WO 99/30822 and its priority document, U.S. patent application Ser. No. 08/991,160, filed 16 Dec. 1997.

U.S. Pat. No. 5,318,935 describes bridged and unbridged bisamido transition metal catalyst compounds of Group 4 metals capable of insertion polymerization of α-olefins. Bridged bis(arylamido) Group 4 compounds for olefin polymerization are described by D. H. McConville, et al, in *Organometallics* 1995, 14, 5478-5480. Synthesis methods and compound characterization are presented. Further work appearing in D. H. McConville, et al, *Macromolecules* 1996, 29, 5241-5243, describes bridged bis(arylamido) Group 4 compounds that are active catalysts for polymerization of 1-hexene. Additional transition metal compounds suitable in accordance with the invention include those described in WO 96/40805. Cationic Group 3 or Lanthanide metal complexes for coordination polymerization of olefins are disclosed in copending U.S. patent application Ser. No. 09/408,050, filed 29 Sep. 1999, and its equivalent PCT/US99/22690. The precursor metal compounds are stabilized by a monoanionic bidentate ancillary ligand and two monoanionic ligands and are activable with the NCA cocatalyst compounds of the invention.

Additional description of suitable organometallic or organometalloid catalyst precursor compounds may be found in the literature, any of such will be suitable where comprising, or where capable of alkylation to comprise, ligands capable of ionizing abstraction. See, for instance, V. C. Gibson, et al, "The Search for New-Generation Olefin Polymerization Catalysts: Life Beyond Metallocenes", *Angew. Chem. Int. Ed.*, 38, 428-447 (1999).

An NCA-containing cocatalyst compound suitable for use in combination with catalyst precursor compounds as specified above may be represented by the general formula $(Ct^+)$ $(NCA^-)$ wherein $(NCA^-)$ is the noncoordinating anion used according to the present invention.

Effective cations $(Ct^+)$ can be any of those known to be suitable for the abstraction of any of monoanionic hydride, alkyl, or other hydrocarbyl or hydrocarbylsilyl ligands on organometallic compounds suitable as insertion polymerization catalysts, or scission of covalent metal-carbon $\eta^1$ or $\eta^2$ bonds in such organometallic compounds. The cation is chosen to minimize its interference essentially non-interfering with the ionic catalyst complexes at least enough so that it does not harm the catalyst complexes' catalytic ability. Such include nitrogen-containing cations such as the anilinium and ammonium salts of U.S. Pat. No. 5,198,401, and WO 97/35893, the trityl carbenium cations of U.S. Pat. No. 5,387,568, metal cations, e.g., $Ag^+$, the silylium cations of WO 96/08519, and the cations of the hydrated salts of Group 1 or 2 metals of U.S. Pat. No. 5,767,208. Additionally suitable cations include nitrogen-and carbon-based cations described in WO 97/35893 and WO 01/29096, and in copending U.S. patent applications Ser. Nos. 60/160,942, filed 22 Oct. 1999, and 60/169,768, filed 9 Dec. 1999. Thus hydrocarbyl, hydrocarbyl-amine, hydrocarbyl-silyl, preferably $C_1$-$C_{20}$, and Group 1, 2, 11 and 12 metal based cations, are suitable in accordance with the invention.

The NCAs of the present invention comprise at least 33 atoms Z. The atoms Z can be any atoms as long as they are different from hydrogen and fluorine. But this does not exclude, it explicitly includes, the possible presence of H and F atoms in the NCAs of the present invention. In fact, NCAs containing one or more F atoms (e.g., at least 5, at least 10, at least 20, at least 25 etc. fluorine atoms) are alternatives of NCAs for use in the present invention. But it is believed that due to their size, H and F atoms do not sufficiently contribute to the desired bulkiness of the subject NCAs, even if they are present in total numbers of at least 5, at least 10, at least 20, at least 30, at least 40, at least 50, or even higher.

Alternative NCAs according to the present invention comprise at least 37, alternatively at least 41, or at least 45 atoms Z, e.g., at least 49, at least 53, or at least 57 atoms Z. On the other hand, some NCA embodiments do not comprise more than 300, alternatively not more than 200 or not more than 150, or not more than 120 atoms Z. For example, these NCAs often do not comprise more than 100, for example, not more than 90 atoms Z. They are non-polymeric, and usually they are at least somewhat soluble in organic solvents such as, e.g., aromatic hydrocarbons (e.g., toluene).

In some embodiments, the atoms Z are selected from Groups 3-17 elements (excluding F) and the lanthanides, particularly from the transition metals of Groups 3-12, B, Al, Ga, C, Si, Ge, N, P, O, Cl, Br. Among these, elements from Groups 8-10 (e.g., Fe, Co, Ni, Rh, Pd and Pt), B, Al, C, Si, N, P, O and Cl are useful. It is preferred for the atoms Z to comprise at least two different atoms, these atoms being selected, in particular, from B, Al, C, Si and N. In most cases C will be present in the NCAs for use in the present invention. Often the remaining atom(s) Z comprise(s) B. More specifically, generally at least 50% of the atoms Z are carbon atoms. Alternatively at least 60%, or at least 75% of the atoms Z are carbon atoms. But, even more than 80%, more than 85%, and even more than 90% of the atoms Z may be carbon atoms. In some NCAs the percentage of carbon atoms Z may be 95% and higher.

The NCAs used according to the present invention may have virtually any structure that accommodates at least 33 atoms Z. This includes linear, branched, cyclic, star-shaped, cage-like, mononuclear and polynuclear species etc., such as, e.g., polynuclear boranes, carboranes, metallacarboranes, polyoxoanions and anionic coordination complexes. For example, U.S. Pat. No. 6,180,829 describes polyhalogenated monoheteroboranes which can serve as basic structures for NCAs for use according to the present invention (e.g., by introducing a sufficiently bulky substituent therein). Further non-limiting examples of NCAs of a type suitable for the purposes of the invention are described, for example, in J. Am. Chem. Soc. 123, 2, 223-237 (2001). This article describes very weakly coordinating NCAs of the formula [CN{B($C_6F_5$)$_3$}$_2$]$^-$ (40 atoms Z) and [M{CNB($C_6F_5$)$_3$}$_4$]$^{2-}$ (85 atoms Z) with M=Ni, Pd. The above documents are incorporated herein by reference in their entireties for purposes of U.S. patent practice.

In the following disclosure, further aspects of NCAs suitable for the purposes of the present invention will be discussed by making reference to preferred embodiments (structures) thereof. It is to be understood, however, that these aspects apply to the NCAs of the present invention in general, and are not limited to the discussed preferred structures thereof.

One class of noncoordinating anions (NCA$^-$) suitable for purposes of the present invention can be described as comprising (a) one or more central core atoms selected from Groups 3-12, 13, 14 and 15 and the lanthanides; and, directly or indirectly bonded thereto, (b) at least (33-m) atoms selected from atoms of one or more of Groups 13, 14, 15 and 16, chlorine, bromine and iodine, m being the number of central core atoms (a).

Typical examples of central core atoms (a) are B, Al, Ga, Si, Ge, Sn, Pb, P, As, Sb and transition metals such as Ni and Pd. Among these, B, Al, Si and P are preferred, with B being particularly preferred. Preferred values of m are 1, 2 and 3, with 1 and 2 being more preferred and m=1 being most preferred. For example, for m=1, the atoms (a) and (b) together can form NCAs of, for example, the formulae $MX_4^-$ (M=Group 13 element), $MX_6^{2-}$ (M=Group 14 element) and $MX_6^-$ (M=Group 15 element), with X representing the same or different radicals bonded to M through a covalent bond. These (4 or 6, respectively) radicals X together include at least 32 atoms (b), specific examples of which are C, N, O, S, Se, Te, B, Al, Ga, Si, Ge, Sn, Pb, P, As, Sb, Cl, Br and I. Preferred atoms (b) are C, N, O, Si, P, S, Cl and Br, with C, N, O, Si and Cl being particularly preferred. Of course, the presence of at least 33-m atoms (b) bonded directly or indirectly to m central core atoms (a) does not exclude the possible presence of atoms of other elements. As already discussed above, examples of atoms that may additionally be present are H and F atoms.

The total number of atoms (a) plus (b) is usually at least 37, in particular at least 41. Preferably the number of atoms (a) and (b) together is at least 49, particularly preferred at least 53, e.g., at least 61, for example, at least 73. While there is no upper limit for the number of atoms (a) plus (b), their number usually will not exceed 250, often not exceed 150, and even more often, not exceed 100. The molecular weight of the resulting NCA will often be at least 700, more often at least 800 and even more preferred at least 900, for example, at least 1000, at least 1100 or even at least 1200. It also is to be noted that not all of the four or six, respectively, radicals X in the exemplary formulae given above for m=1 will always contribute the same number of atoms (b). For example, one or two radicals X may represent, e.g., H, F or $C_1$-$C_4$ alkyl (such as methyl), in which case the requisite minimum number of atoms (b) is contained in the remaining radicals X. Particularly preferred combinations are as follows (for m=1):

(1) atom (a)=B; bonded to at least 40 atoms (b), all of which are carbon atoms;

(2) atom (a)=B; bonded to at least 48 atoms (b) selected from C, N and Si atoms;

(3) atom (a)=B; bonded to at least 52 atoms (b), selected from C, O, N and Si atoms.

The NCAs of the present invention may be mononuclear, i.e., comprise only one central core atom (a). However, the NCAs may also be polynuclear, comprising two or more central core atoms (a) connected by a covalent bond or a divalent or higher polyvalent moiety such as a bridging atom (e.g., O, N etc.) or bridging group. A non-limiting example of a corresponding dinuclear NCA is [CN{B($C_6F_5$)$_3$}$_2$]$^-$, described in the article in J. Am. Chem. Soc., supra. Moreover, two or more bridging groups may form one or more ring structures together with two or more central core atoms (a).

It also is to be taken into account that the structure of the NCA employed for the preparation of the catalyst composition and the structure of the NCA present in the final polymer (after polymerization, catalyst deactivation, polymer processing etc.) are not necessarily identical. Apparently, if there is a difference in structure, it is the structure assumed by (or assumable by) the NCA in the final polymer (or the catalyst residue contained therein, respectively) that determines the suitability of the polymer for the purposes of the present invention, e.g., wire and cable insulation.

Another class of invention NCAs comprises at least one unit of general formula (I):

wherein:

M is an element selected from Groups 13-15;

$R^1$ and $R^2$ are independently selected from (a) radicals comprising a ring system having at least 9 ring members; and (b) radicals comprising a ring having 5 to 8 ring members and at least one substituent group comprising at least 5 atoms selected from carbon, nitrogen, oxygen, silicon, phosphorus, chlorine and bromine;

$R^3$ to $R^n$ are (is) independently selected from the above radicals (a) and (b), halogen, and hydrocarbyl; and n equals the valence of M minus 1.

Some embodiments select M in formula (I) from Groups 13 and 15. Some embodiments select from B, Al and P. Some embodiments select from Group 13, B being most preferred. Preferred radicals (a) are those having at least 10 ring members, and even more preferred radicals (a) are fused aromatic ring systems, such as, e.g., naphthyl, indenyl, fluorenyl, anthracyl, phenanthryl and azulyl. Further illustrative and non-limiting examples of fused aromatic ring systems employable as radicals (a) are depicted in WO 99/45042, incorporated herein by reference in its entirety for purposes of U.S. patent practice. Ring systems containing heteroatoms such as, e.g., oxygen, nitrogen and sulfur, may also be used as radical (a). Furthermore, these ring systems may be substituted by one or more substituents, such as, e.g., optionally substituted alkyl, cycloalkyl, arylalkyl, alkylaryl and aryl groups (e.g., methyl, ethyl, benzyl, tolyl, phenyl, biphenylyl, naphthyl and halogenated derivatives thereof) and these groups bonded to the ring system through, e.g., an oxygen, nitrogen or silicon atom; halogen (in particular F and Cl); $NO_2$; and groups of the formulae COR, COOR and $SO_3R$ where R is an optionally substituted alkyl or aryl group. Preferred substituents (which may be the same or different) are F, fluorinated alkyl groups (e.g., $CF_3$) and fluorinated aryl groups (e.g., fluorinated phenyl groups such as $C_6F_5$). For example, the ring systems may be partly or completely fluorinated (i.e., perfluorinated). Specific examples of such systems are the various isomeric monofluoronaphthyl, difluoronaphthyl, trifluoronaphthyl, tetrafluoronaphthyl, pentafluoronaphthyl, hexafluoronaphthyl and heptafluoronaphthyl, (=perfluoronaphthyl) groups (these groups may be bonded through either the 1- or the 2-position). Moreover, two or more radicals (a) may be connected through a single or multiple bond and/or a connecting group and/or a connecting atom such as, e.g., —$CH_2$—, =CH—, —O—, =N—, to thereby form one or more additional rings together with M. A radical (a) may, of course, also be connected to a radical (b), if present.

Examples of radicals (b) for the above formula (I) are substituted aliphatic, heteroaliphatic, aromatic and heteroaromatic rings containing 5, 6, 7 or 8 ring members selected from C, N, O and S. The aliphatic and heteroaliphatic rings may be saturated or unsaturated. Specific examples of such radicals are cyclopentyl, cyclohexyl, cyclopentenyl, cyclohexenyl, cyclohexadienyl, cyclooctyl, cyclooctenyl, cyclooctadienyl, tetrahydrofuranyl, tetrahydropyranyl, pyrrolidinyl, pyrrolinyl, piperidinyl, morpholinyl, piperazinyl, tetrahydrothienyl, phenyl, pyrrolyl, pyridinyl, furanyl, pyranyl, thienyl, thiazolyl, pyrazolyl and oxazolyl. An aromatic ring and, in particular, phenyl is a preferred ring for the radicals (b). Moreover, two or more of these rings may be connected through a single or multiple bond and/or a connecting group and/or a connecting atom such as, e.g., —$CH_2$—, =CH—, —O—, =N—, to thereby form, together with M, one or more additional rings. Analogous considerations apply in the case of the simultaneous presence of radicals (a) and radicals (b). For example, a naphthyl group (a) and a phenyl group that is a part of a radical (b) may be bonded together.

The rings that are part of the radicals (b) preferably have at least one substituent group comprising at least 5 atoms selected from carbon, nitrogen, oxygen, silicon, phosphorus, chlorine and bromine. It is to be understood, however, that the at least one substituent group need not be present, if there is at least one other unit in the NCA which provides the remainder of the requisite number of atoms Z. An illustrative, non-limiting example of such a case is an NCA comprising more than one, e.g., two, three or four, units of general formula (I) above. Again, the above-mentioned NCA having the formula $[CN\{B(C_6F_5)_3\}_2]^-$ may be referred to as a non-limiting example of a case where the at least one substituent group need not be present. Other instances where the presence of the at least one substituent group may be dispensed with are the presence of a total number of radicals R in excess of 4 and/or the simultaneous presence of at least two radicals (a).

If present, the at least one substituent group of the radicals (b) preferably comprises at least 6, e.g., 7 or 8, and, even more preferred, at least 9 (e.g., at least 10 or 11) atoms selected from the above group of elements. Preferred elements are carbon, nitrogen, oxygen, silicon and chlorine. Of course, the presence of the at least 5 atoms specified above in the substituent group does not exclude the possible presence of atoms of other elements. Non-limiting, illustrative examples of atoms that may additionally be present are H and F atoms. Non-limiting, illustrative examples of suitable substituent groups for the rings that form a part of the radicals (b) are alkyl, cycloalkyl, aryl and heteroaryl groups, all of which may be substituted, and any combinations thereof (e.g., arylalkyl and alkylaryl groups). Furthermore, these groups may be bonded to the ring through one or more heteroatoms such as O, N, and Si. Also, in addition to the at least one substituent as defined above, the rings having 5 to 8 ring members that constitute a part of the radicals (b) may have one or more further substituents which do not satisfy the above definition of the at least one substituent.

Preferred examples of the at least one substituent are substituted and unsubstituted (=optionally substituted) aryl groups such as optionally substituted phenyl and naphthyl groups as well as hydrocarbylsilyl groups (such as trialkylsilyl and triarylsilyl groups) and moieties comprising such aryl and hydrocarbylsilyl groups. Examples of optional substituents for the aryl groups which serve as the at least one substituent (and also for the above rings having 5 to 8 ring members that carry the at least one substituent) include optionally substituted alkyl, cycloalkyl and aryl groups (e.g., methyl, ethyl, cyclohexyl, phenyl, biphenylyl, naphthyl and halogenated derivatives thereof) and corresponding groups bonded to the aryl group (and the ring having 5 to 8 ring members, respectively) through, e.g., an oxygen, nitrogen or silicon atom; halogen (in particular F and Cl); $NO_2$; and groups of the formulae COR, COOR and $SO_3R$ (where R is an optionally substituted alkyl or aryl group). An example of these preferred optional substituents (which, if two or more are present, may be the same or different) is F. In fact, especially for stability reasons, a partly or completely fluorinated phenyl (or phenylene) group is both (i) a particularly preferred example of a ring having 5 to 8 ring members and (ii) a particularly preferred example of the at least one substituent or part of a moiety which constitutes such a substituent. Non-limiting, illustrative examples of corresponding phenyl groups are o-, m- and p-monofluorophenyl, 2,3-, 2,4-, 2,5-, 2,6- and 3,5-difluorophenyl, 2,3,4-, 2,3,5-, 2,3,6-, 2,4,5- and 2,4,6-trifluorophenyl, 2,3,4,5-, 2,3,5,6- and 2,4,5,6-tetrafluorophenyl and pentafluorophenyl groups and the corresponding (polyvalent) phenylene groups.

Preferred trialkylsilyl and triarylsilyl groups which may constitute the at least one substituent group or a part thereof, respectively, of the radical (b) are triphenylsilyl groups (with unsubstituted or optionally substituted phenyl) and trialkylsilyl groups containing at least 6 and, preferably, at least 9 carbon atoms. Usually the alkyl groups will be identical. Non-limiting, illustrative examples thereof include triethylsilyl, tri(n-propyl)silyl, triisopropylsilyl and tributylsilyl.

Of course, the above preferred substituent groups can also be combined into a single substituent group, e.g., by bonding them to the ring through a common linking group such as an alkyl group, or through a common linking atom such as a nitrogen, carbon or phosphorus atom, or by substituting, e.g., a fluorinated phenyl ring substituent with a corresponding silyl group.

In the above formula (I), the radicals $R^3$ to $R''$ may each independently be the same or different from the radicals (a) and (b). If different, they may be halogen, in particular, F, Cl, Br, I, and hydrocarbyl, in particular, an unsubstituted phenyl group or a fluorine-substituted phenyl group. Specific examples of the fluorine-substituted phenyl group are the various monofluorophenyl, difluorophenyl, trifluorophenyl, tetrafluorophenyl and perfluorophenyl groups.

Exemplary NCAs of the above general formula (I) are those in which at least three or even all radicals $R^1$ to $R''$ are selected from radicals (a) and (b). In that case it is also preferred for these radicals to be identical. The moiety that is bonded to the unit of general formula (I) may have various structures. As already mentioned, it may, for example, comprise a multivalent linking group or linking atom to which one or more other units of general formula (I) are bonded. Illustrative examples are the NCAs described in the article in J. Am. Chem. Soc., supra. Moreover, the moiety to which the unit of general formula (I) is bonded may be a radical $R''^{+1}$ which has any of the meanings given for the radicals $R^1$ to $R''$. For example, all radicals $R^1$ to $R''^{+1}$ may be identical. In another embodiment $R^1$ to $R''$ are identical and $R''^{+1}$ is different. The latter will usually be the case if the NCA is derived from a neutral compound of the formula $MR^1R^2R^3 \ldots R''$ which is converted into an NCA by abstracting an anion from, e.g., the transition metal atom of the catalyst precursor compound, thereby at the same time giving rise to a catalytically active transition metal cation. An illustrative, non-limiting example of such a neutral NCA precursor compound is $BR^1R^2R^3$, where $R^1$ to $R^3$ are as defined above. For example, $R^1$ to $R^3$ may be identical, representing a radical (a) or (b).

A preferred class of NCAs containing one or more units of general formula (I) above is represented by those that comprise at least one unit of general formula (II):

(II)

wherein $Ar^1$ to $Ar^3$ are aryl radicals, at least two of the aryl radicals independently selected from (i) fused aromatic ring systems having at least 10 carbon atoms; and
(ii) phenyl groups having at least one substituent selected from phenyl groups, naphthyl groups, hydrocarbylsilyl groups and moieties comprising at least one of these groups.

As non-limiting, illustrative examples of radicals (i), i.e., fused aromatic ring systems having at least 10 carbon atoms, naphthyl, indenyl, fluorenyl, anthracyl, phenanthryl and azulyl radicals may be mentioned. Fused ring systems containing heteroatoms such as, e.g., oxygen, nitrogen and sulfur, may also be used as radicals (i). Furthermore, these ring systems may be substituted by one or more substituents, such as, e.g., optionally substituted alkyl, cycloalkyl, arylalkyl, alkylaryl and aryl groups (e.g., methyl, ethyl, phenyl, biphenylyl, naphthyl and halogenated derivatives thereof) and the corresponding groups bonded to the ring system through, e.g., an oxygen, nitrogen or silicon atom; halogen (in particular F and Cl); $NO_2$; and groups of the formulae COR, COOR and $SO_3R$ where R is an optionally substituted alkyl or aryl group. Preferred substituents (which may be the same or different) are F, fluorinated alkyl groups (e.g., $CF_3$) and fluorinated aryl groups (e.g., fluorinated phenyl groups such as $C_6F_5$). In non-limiting, illustrative examples the fused ring systems (i) may be partly or, even more preferred, completely fluorinated. Non-limiting, illustrative examples of such systems are the various isomeric monofluoronaphthyl, difluoronaphthyl, trifluoronaphthyl, tetrafluoronaphthyl, pentafluoronaphthyl, hexafluoronaphthyl and heptafluoronaphthyl groups, and fluorinated (e.g., perfluorinated) anthracyl and phenanthryl groups. Moreover, two or more radicals (i) may be connected through a carbon-carbon bond and/or a connecting group and/or a connecting atom such as, e.g., —$CH_2$—, =CH—, —O—, =N—, to thereby form, together with B, one or more additional rings.

Examples of radicals (ii) are (preferably fluorinated) phenyl groups having one, two or three substituent groups selected from (preferably fluorinated) phenyl, biphenylyl and naphthyl groups, trialkylsilyl and triphenylsilyl groups and moieties comprising one or more of these groups. If only one of these substituent groups is present, it is preferably in the 4-position of the phenyl ring. Particularly preferred substituents for the phenyl group are perfluorophenyl, perfluorobiphenylyl, perfluoronaphthyl, tri($C_{1-8}$alkyl)silyl and tri(unsubstituted phenyl)silyl groups and moieties comprising at least one, e.g., two, of these groups. Non-limiting, illustrative examples of the latter moieties are linking atoms or linking groups which are directly and covalently bonded to the phenyl ring and are also covalently bonded to one or more of the above-defined groups. Such a linking group may, for example, be an alkyl or cycloalkyl group and such groups in which one or more of the methylene groups are replaced by, e.g., an oxygen atom or a nitrogen radical. The linking atom may be an oxygen or nitrogen atom. In the case of nitrogen, two of the above-defined groups, the same or different, may be bonded to the nitrogen atom. For example, the moieties (ii) may be selected from aryloxy such as phenoxy and naphthoxy (e.g., fluorophenoxy and fluoronaphthoxy); aryloxyalkyl such as phenoxyalkyl and naphthoxyalkyl (e.g., fluorophenoxyalkyl and fluoronaphthoxyalkyl); aralkoxy such as phenylalkoxy (e.g., fluorophenylalkoxy); aryl-trihydrocarbylsilylalkyl such as phenyl-trihydrocarbylsilylalkyl (e.g., fluorophenyl-trialkylsilylalkyl); N-alkyl-N-arylamino such as N-alkyl-N-phenylamino (e.g., N-alkyl-N-fluorophenylamino); N-trihydrocarbylsilyl-N-arylamino such as N-trihydrocarbylsilyl-N-phenylamino and N-trihydrocarbylsilyl-N-naphthylamino (e.g., N-trialkylsilyl-N-fluorophenylamino and N-trialkylsilyl-N-fluoronaphthylamino); N-alkyl-N-trihydocarbylsilylamino such as N-alkyl-N-trialkylsilylamino; diarylamino such as diphenylamino (e.g., bis(fluorophenyl) amino); bis(trihydrocarbylsilyl)amino such as bis(trialkylsilyl)amino; aryloxyaryl such as phenoxyphenyl and naphthoxyphenyl (e.g., (fluorophenoxy)fluorophenyl and (fluoronaphthoxy)fluorophenyl); aryloxyalkaryl such as phenoxyalkylphenyl and naphthoxyalkylphenyl (e.g., (fluorophenoxyalkyl)fluorophenyl and (fluoronaphthoxyalkyl) fluorophenyl); arylalkoxyaryl such as phenylalkoxyphenyl (e.g., (fluorophenylalkoxy)fluorophenyl); (aryl-trihydrocarbylsilylalkyl)aryl such as (phenyl-trihydrocarbylsilylalkyl) phenyl (e.g., (fluorophenyl-trialkylsilylalkyl)fluoro-phenyl); N-alkyl-N-arylaminoaryl such as (N-alkyl-N-phenylamino) phenyl (e.g., (N-alkyl-N-fluorophenylamino)fluorophenyl); (N-trihydrocarbylsilyl-N-arylamino)aryl such as (N-trihydrocarbylsilyl-N-phenylamino)phenyl and (N-trihydrocarbylsilyl-N-naphthylamino)-phenyl (e.g., (N-trialkylsilyl-N-fluorophenylamino)fluorophenyl and (N-trialkylsilyl-N-fluoronaphthylamino)fluorophenyl); (N-alkyl-N-trihydocarbylsilylamino)aryl such as (N-alkyl-N-trialkylsilylamino)phenyl; diarylaminoaryl such as diphenylaminophenyl (e.g., [bis(fluorophenyl)amino]fluorophenyl); and [bis(trihydrocarbylsilyl)amino]aryl such as [bis(trialkylsilyl)amino]phenyl.

Additionally, the hydrogen atoms of the phenyl ring of radical (ii) which are not already replaced by one or more of the above mandatory substituents may be replaced by other substituents such as, by way of non-limiting, illustrative example, optionally halogenated (e.g., fluorinated or chlorinated) alkyl groups (such as methyl, ethyl, trifluoromethyl, chloromethyl etc.), the corresponding alkoxy groups, arylalkyl groups (such as benzyl) and halogen atoms (e.g., F and Cl). Preferred examples of such optional substituents are F and fluorinated methyl groups, particularly F and $CF_3$. A particularly preferred radical (ii) is a tetrafluorophenyl group having one of the above mandatory substituent groups, preferably a pentafluorophenyl group, a tri($C_{1-4}$ alkyl)silyl group or a moiety comprising one, two or three of these groups (identical or different). Preferably, the substituent group is in the 4-position of the tetrafluorophenyl group.

Preferred embodiments of NCAs comprising the unit of general formula (II) above are represented by general formula (III):

$$[BAr^1Ar^2Ar^3Ar^4]^!$$ (III)

wherein $Ar^4$ has the meanings given for $Ar^1$ to $Ar^3$. NCAs wherein all of $Ar^1$ to $Ar^4$ are identical are even more preferred.

If only two or three of the aryl radicals $Ar^1$ to $Ar^4$ in general formula (III) represent radicals (i) and/or (ii), the remaining radical(s) preferably represent(s) an unsubstituted or halogenated (particularly, fluorinated) phenyl group, e.g., a pentafluorophenyl group. Preferably at least three radicals $Ar^1$ to $Ar^4$ are selected from radicals (i) and (ii) and even more preferred, all of $Ar^1$ to $Ar^4$ are (identical) radicals (i) or (ii), in particular, fluorinated radicals.

Preferred examples of the radicals $Ar^1$ to $Ar^4$ are heptafluoronaphthyl, i.e., heptafluoro-1-naphthyl and heptafluoro-2-naphthyl; nonafluorodiphenyl such as nonafluoro-p-diphenyl; N-pentafluorophenyl-N-tri($C_1$-$C_8$alkyl) silylaminotetrafluorophenyl such as 4-(N-pentafluorophenyl-N-trimethylsilylamino)tetrafluorophenyl and 4-(N-pentafluorophenyl-N-triethylsilylamino)tetrafluorophenyl; tris($C_3$-$C_8$alkyl)siloxytetra-fluorophenyl such as 4-triisopropylsiloxy-tetrafluorophenyl; bis(pentafluorophenyl)-fluoromethyltetrafluorophenyl such as 4-bis(pentafluorophenyl) fluoromethyltetra-fluorophenyl; (heptafluoronaphthyl) tetrafluorophenyl, i.e., (heptafluoro-1-naphthyl) tetrafluorophenyln and (heptafluoro-2-naphthyl) tetrafluorophenyl; (nonafluorobiphenyl)tetrafluorophenyl such as (nonafluoro-p-biphenyl)tetrafluorophenyl; [N-pentafluorophenyl-N-tri($C_1$-$C_8$alkyl)silylamino-tetrafluorophenyl]tetrafluorophenyl such as 4-[(N-pentafluorophenyl-N-trimethylsilylamino)tetrafluorophenyl]tetrafluoro-phenyl and [4-(N-pentafluorophenyl-N-triethylsilylamino)tetrafluorophenyl]tetrafluoro-phenyl; [tris($C_3$-$C_8$alkyl)siloxytetrafluorophenyl]tetrafluorophenyl such as [4-triisopropylsiloxy-tetrafluorophenyl]tetrafluorophenyl; and [bis(pentafluorophenyl)fluoro-methyltetrafluorophenyl] tetrafluorophenyl such as [4-bis(pentafluorophenyl) fluoromethyl-tetrafluorophenyl]tetrafluorophenyl.

As already set forth above in connection with NCAs comprising a unit of general formula (I), $Ar^4$ in the above formula (III) may be replaced by a group that is derived from the reaction of a neutral compound of formula $BAr^1Ar^2Ar^3$ and a compound that this neutral compound (Lewis acid) is capable of abstracting an anion from (e.g., an alkyl group). The other compound may, for example, be a catalyst precursor compound.

The NCA-containing ionic cocatalyst (activator) compounds of the invention may be prepared by synthetic methods well within the skills of organic and organometallic chemists. By way of non-limiting, illustrative example, in a typical procedure for the preparation of a cocatalyst compound containing an NCA of the above general formula (II) wherein $Ar^1$ to $Ar^4$ are identical and represent N-perfluorophenyl-N-trialkylsilylamino-tetrafluorophenyl or N-perfluorophenyl-N-alkylamino-tetrafluoro-phenyl, pentafluoroaniline in an aprotic polar solvent is combined with pentafluorobromobenzene in the presence of a base. Other possible amines may be used. Non-limiting, illustrative examples of useful alternatives in this context are 4-aminononafluorobiphenyl or 2-aminoheptafluoronaphthyl. After work-up, the combination of the fluoroamine and the halobenzene affords N-(4-bromotetrafluoro-phenyl)-pentafluoroaniline. Metallation of this secondary amine with a metal hydride provides the corresponding secondary metal amide, which is then treated with an alkylchloride, alkylbromide, or a chlorotrialkylsilane. The resulting product is the corresponding tertiary amine. In a one-pot procedure, this tertiary amine is first reacted with an alkyllithium like n-butyllithium, and then with one quarter of an equivalent of boron trichloride. In the case of the chlorotrialkylsilane this sequence of reactions provides Li(Et$_2$O)$_{2.5}$[4-($C_6F_5$N{SiR$_3$})—$C_6F_4$]$_4$B. Reacting this lithium salt with a dialkylanilinium chloride affords the corresponding dialkylanilinium borate. A specific example of the aforementioned reaction sequence is shown in Scheme 1 below where TMS represents the trimethylsilyl group.

Scheme 1
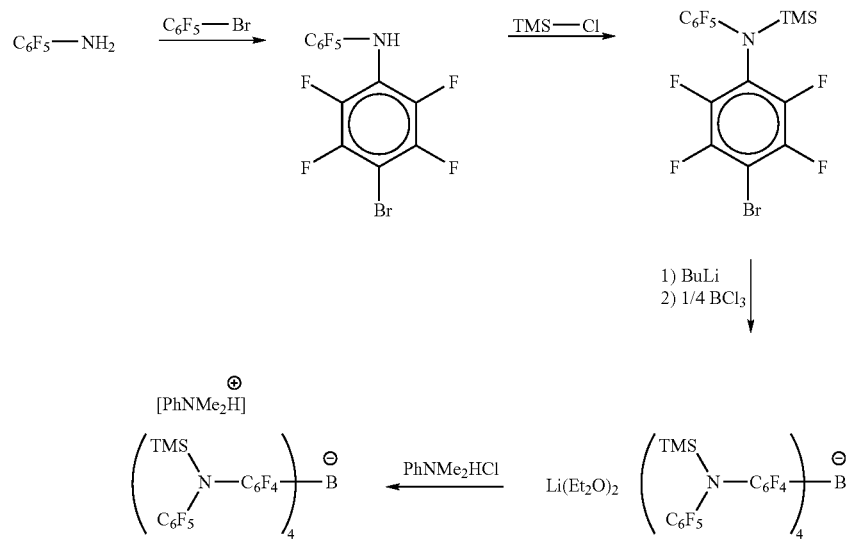
The above N-(4-bromotetrafluorophenyl)-N-trimethylsilylpentafluoroaniline intermediate may, by way of non-limiting, illustrative example, be replaced by compounds of the following formulae:
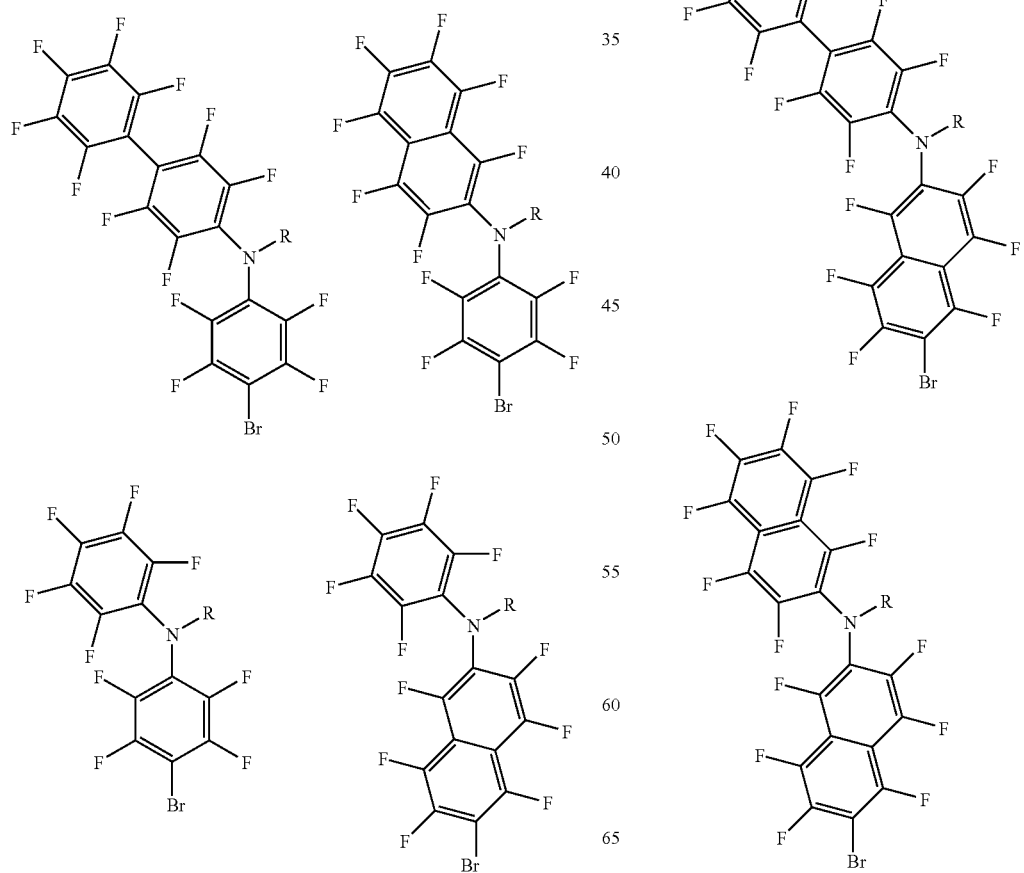

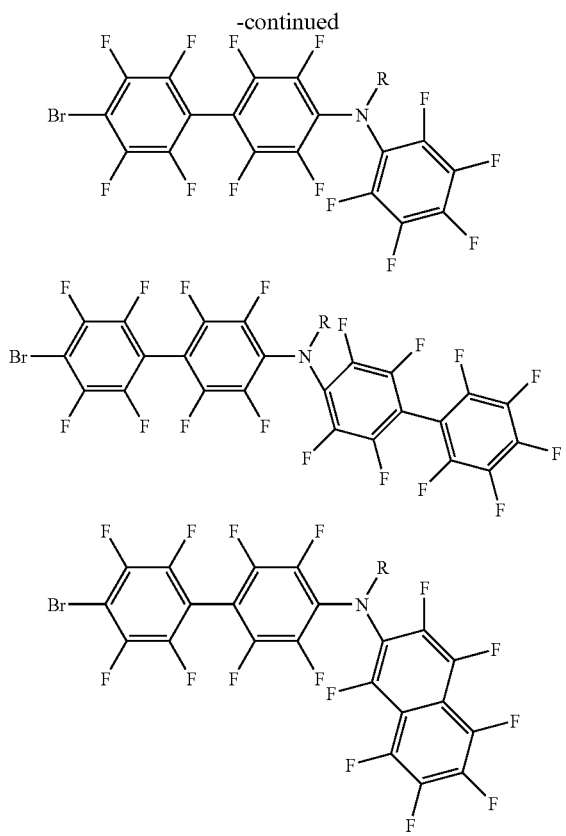

Exemplary R groups include methyl, ethyl, n-propyl, isopropyl, n-butyl, cyclohexyl, benzyl, trimethylsilyl, triethylsilyl, tri-n-propylsilyl, triisopropylsilyl, etc.

In another typical procedure for making a cocatalyst compound according to the present invention, bromotetrafluorophenol is converted to the siloxy substituted counterpart by reacting with a trialkylchlorosilane in the presence of a strong base such as potassium hydride. The reaction product is then converted by reaction with BuLi and an appropriate amount of a trihalylborane or aluminane. The resulting lithium salt can then be converted to an activating cocatalyst salt by cation exchange reaction with a halide salt, for example anilinium or ammonium salts. This reaction sequence is illustrated in Scheme 2 below.

Scheme 2

A typical procedure for the synthesis of NCAs suitable for the purposes of the present invention is described in, e.g., Japanese Unexamined Patent Publication Hei 10-60034, incorporated herein by reference in its entirety for purposes of U.S. patent practice.

When using the above catalyst precursor compounds and cocatalyst compounds, the total catalyst system will generally additionally comprise one or more organometallic compound scavenging agents. Such compounds include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion precursors are used to activate the catalyst precursor. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157 and 5,241,025 and WO-A-91/09882, WO-A-94/03506, WO-A-93/14132, and that of WO 95/07941, the disclosures of which are expressly incorporated herein by reference in their entireties for purposes of U.S. patent practice. Exemplary compounds include triethyl aluminum, triethyl borane, triisobutyl aluminum, methylalumoxane, and isobutyl aluminumoxane. Those compounds having bulky or $C_6$-$C_{20}$ linear hydrocarbyl substituents covalently bound to the metal or metalloid center are preferred to minimize adverse interaction with the active catalyst. Examples of bulky compounds include triisobutylaluminum, triisoprenylaluminum, and long-chain linear alkyl-substituted aluminum compounds, such as tri-n-hexylaluminum, tri-n-octylaluminum, or tri-n-dodecylaluminum.

The above-described catalyst systems of the invention are useful in the polymerization of unsaturated monomers conventionally known to be polymerizable under coordination polymerization conditions using metallocenes. Such conditions are well known and include solution polymerization, slurry polymerization, gas-phase polymerization, and high pressure polymerization. The catalyst systems of the invention may be supported on inorganic oxide or polymeric supports and as such will be particularly useful in the known operating modes employing fixed-bed, moving-bed, fluid-bed, slurry or solution processes conducted in single, series or parallel reactors. Pre-polymerization of supported catalyst of the invention may also be used for further control of polymer particle morphology in typical slurry or gas phase reaction processes in accordance with conventional teachings. A preferred method of supporting the invention catalysts for gas phase or slurry polymerization is described in WO 98/55518, the disclosure of which is expressly incorporated herein by reference in its entirety for purposes of U.S. patent practice.

In alternative embodiments of olefin polymerization methods, the catalyst system is employed in liquid phase (solution, slurry, suspension, bulk phase or combinations thereof), in high pressure liquid or supercritical fluid phase, or in gas phase. Each of these processes may also be employed in singular, parallel or series reactors. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic, hexane being preferred. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399; 4,588,790; 5,028,670; 5,382,638; 5,352,749; 5,408,017; 5,436,304; 5,453,471; 5,463,999; 5,767,208; and WO 95/07942. The disclosure of each of these documents is expressly incorporated herein by reference in its entirety for purposes of U.S. patent practice.

More generally, the NCAs of the present invention can be effectively introduced into a polymerization medium, or premixed with an organometallic catalyst precursor compound prior to introduction into the polymerization medium, as Bronsted acid salts containing charge-balancing counteractions, ionic cocatalyst compounds. See also, the review article by S. H. Strauss, "The Search for Larger and More Weakly Coordinating Anions", Chem. Rev., 93, 927-942 (1993), the disclosure of which is expressly incorporated herein by reference in its entirety for purposes of U.S. patent practice.

Generally speaking, the polymerization reaction temperature is at least about 40° C., preferably at least about 60° C., and usually not higher than about 250° C., preferably not higher than about 220° C. The pressure can vary from about 1 mm Hg, preferably about 0.1 bar and even more preferred about 1.0 bar, to about 2500 bar, preferably about 1600 bar, most preferably about 500 bar.

For homogenous solution polymerization best results may be obtained when the quantity and type of solvent used to introduce the catalyst is controlled as well as the manner of introduction. Generally it is believed preferable to achieve full solution and avoid slurried systems, and hence fairly high concentrations of the catalyst, at low temperatures and use low solvent amounts. The ease with which these objectives can be achieved may vary with the solubility of the non-coordinating anion and transition metal components. Some of the more active catalysts or those likely to give a higher molecular weight at a given temperature, may have reduced solubility or may be modified for increased solubility.

Non-limiting, illustrative examples of polymerization processes are solution polymerizations using bridged fluorenyl metallocene hafnium compounds with naphthyl group-containing non-coordinating anions at polymerization temperatures in excess of 110° C., for elastomeric olefin copolymers, and more preferably more than 160° C. and up to 250° C. for plastomeric ethylene copolymers.

Linear polyethylene, including high and ultra-high molecular weight polyethylenes, including both homo- and copolymers with other alpha-olefin monomers, alpha-olefinic and/or non-conjugated diolefins, by way of non-limiting, illustrative example, $C_3$-$C_{20}$ olefins, diolefins or cyclic olefins, may be produced by adding ethylene, and optionally one or more of the other monomers, to a reaction vessel under low pressure (typically <50 bar), at a typical temperature of 40-250° C. with the above-described catalyst systems slurried with a solvent, such as hexane or toluene. Heat of polymerization is typically removed by cooling. Gas phase polymerization can be conducted, for example, in a continuous fluid bed gas-phase reactor operated at 2000-3000 kPa and 60-160° C., using hydrogen as a reaction modifier (100-200 PPM), $C_3$-$C_8$ comonomer feedstream (0.5-1.2 mol %), and $C_2$ feedstream (25-35 mol %). See, U.S. Pat. Nos. 4,543,399; 4,588,790; 5,028,670; 5,405,922; and 5,462,999, the disclosures of which are expressly incorporated herein by reference in their entireties for purposes of U.S. patent practice.

Ethylene-α-olefin (including ethylene-cyclic olefin and ethylene-α-olefin-diolefin) elastomers of high molecular weight and low crystallinity can be prepared utilizing the catalyst systems of the invention under traditional solution polymerization processes or by introducing ethylene gas into a slurry utilizing the α-olefin or cyclic olefin or mixture thereof with other monomers, polymerizable and not, as a polymerization diluent in which the catalyst system is suspended. Typical ethylene pressures will be between 10 and 1000 psig (69-6895 kPa) and the polymerization diluent temperature will typically be between 40 and 160° C. The process can be carried out in a stirred tank reactor, or more than one operated in series or parallel. See the general disclosure of U.S. Pat. No. 5,001,205 for general process conditions. See also, international application WO 96/33227 and WO 97/22639. The disclosures of all of these documents are expressly incorporated herein by reference in their entireties for purposes of U.S. patent practice.

Other olefinically unsaturated monomers besides those specifically described above may be polymerized using the catalyst systems according to the invention, by way of non-limiting, illustrative example, styrene, alkyl-substituted styrenes, isobutylene and other geminally disubstituted olefins, ethylidene norbornene, norbornadiene, dicyclopentadiene, and other olefinically-unsaturated monomers, including other cyclic olefins, such as cyclopentene, norbornene, alkyl-substituted norbornenes, and vinyl group-containing polar monomers capable of coordinating polymerization. See, for example, U.S. Pat. Nos. 5,635,573; and WO 99/30822, the disclosures of which are expressly incorporated herein by reference in their entireties for purposes of U.S. patent practice. Additionally, alpha-olefinic macromonomers of up to 1000 mer units, or more, may also be incorporated by copolymerization yielding branch-containing olefin polymers.

The catalyst systems of the invention can be used as described above individually for coordination polymerization or can be mixed to prepare polymer blends with other known olefin polymerization catalyst compounds. By selection of monomers, blends of coordination catalyst compounds, polymer blends can be prepared under polymerization conditions analogous to those using individual catalyst compositions. Polymers having increased MWD for improved processing and other traditional benefits available from polymers made with mixed catalyst systems can thus be achieved.

The formation of blended polymers can be achieved ex situ through mechanical blending or in situ through the use of a mixed catalyst system. It is generally believed that in situ blending provides a more homogeneous product and allows the blend to be produced in one step.

As already set forth above, examples of (elastomeric) polymers suitable for use in electrical insulation and, in particular, (medium voltage) power cable applications according to the present invention are ethylene/α-olefin and ethylene/α-olefin/non-conjugated diene copolymers. These copolymers usually contain at least about 50, preferably at least about 70, and more preferably at least about 75 mole percent, and usually not more than about 90, preferably not more than about 85 mole percent ethylene, based on the total moles of the polymer. The concentration of alpha-olefin (e.g., propylene, butene-1 and/or hexene-1) usually is at least about 10, preferably at least about 15 mole percent, and usually not more than about 50, preferably not more than about 30, even more preferably not more than about 25 mole percent. The elastomeric polymers generally have a non-conjugated diene content of at least about 0.1 to about 5 mole percent based on the total moles of the polymer. The elastomeric polymers will also have a Mooney viscosity (ML[1+4]@125° C.) of generally at least about 10, preferably at least about 15, and most preferably at least about 20, with the upper limit thereof being not higher than about 80, preferably not higher than about 60, more preferably not higher than about 40. The polymers utilized in the present invention usually have a density in the range of about 0.860 g/cc to about 0.960 g/cc. Preferably, the polymers have a minimum density of about 0.865 g/cc, most preferably about 0.870 g/cc. Preferably, the polymers have a maximum density of about 0.93 g/cc, most preferably about 0.91 g/cc. Preferably the density is in the range of about 0.865 g/cc to about 0.93 g/cc. Most preferably, the density is in the range of about 0.870 g/cc to about 0.910 g/cc. Preferably the melt index (MI) of the polymers utilized in the present invention is such that the polymer can be extruded in the desired end product. Generally the melt index is in the range of about 0.2 dg/min to about 100 dg/min. Preferably, the MI is at least about 1 dg/min, most preferably at least about 3 dg/min. Preferably, the maximum MI is about 50 dg/min, most preferably about 30 dg/min. Preferably the MI is in the range of about 1 dg/min to about 50 dg/min, and most preferably in the range of about 3 dg/min to about 30 dg/min. MI as given herein is determined according to ASTM D-1238 (190/2.16).

The polymer may be a "neat" polymer, or it may optionally be filled. An illustrative example of a suitable filler is Kaolin clay. If the polymer is to be semiconducting, it must be filled with a conducting filler to render the polymer semiconducting. The most common filler for semiconducting applications is carbon black. If filled, the polymer should not be filled past that level that would cause undue degradation of the electrical and/or mechanical properties of the polymer. Generally, for that reason, the filled polymer should comprise no more than about 50 weight percent filler, based on the total weight of the filled polymer, and preferably no more than about 35 weight percent filler.

Other additives commonly employed in polyolefin compositions such as, for example, cross-linking agents, antioxidants, processing aids, pigments, dyes, colorants, metal deactivators, oil extenders, stabilizers, and lubricants may be utilized in the present invention.

Specific examples of particularly preferred elastomeric copolymers are described in U.S. Pat. No. 5,674,613, the disclosure of which is expressly incorporated herein by reference in its entirety for purposes of U.S. patent practice.

Moreover, while the present invention provides polymers which despite the fact that they have been prepared by a process involving a polymerization catalyst system comprising an NCA, have favorable dielectric loss properties that render them suitable for use in electrical insulating and/or semi-conducting compounds, it is apparent that these polymers can be blended with other polymers of the same or a different type which have been prepared in a different manner and/or with different catalysts. By way of non-limiting, illustrative example, if the dielectric loss properties of a specific polymer provided according to the present invention do not completely satisfy the requirements of a contemplated application, one may want to blend that polymer with one or more polymers of the same or a similar type which exceeds these requirements in that regard and does not significantly change other desirable properties of the polymer according to the invention.

When used in electrically insulating and/or semi-conducting compounds, the polymers of the invention are usually present in an amount of at least about 10%, more often at least about 20%, preferably at least about 30%, more preferably at least about 40% or even at least about 50% by weight, based on the total weight of the compound. Usually the compound does not contain more than about 95%, and often not more than about 90% by weight of polymer.

The dielectric loss properties of the polymers of the invention usually are such that the tangent delta thereof, as measured according to ASTM D150-95 after 14 days in water of 90° C., is not higher than about 0.025, preferably not higher than about 0.020, even more preferred not higher than about 0.015 or even not higher than about 0.010, based on a catalyst efficiency of 10,000 g polymer/mmol transition metal contained in the catalyst (e.g., the metallocene used in conjunction with the NCA). For commercially feasible catalyst efficiencies of 50,000 to 500,000 g polymer/mmol transition metal, this translates into a maximum loss tangent of the polymers according to the invention in the range of from about 0.005 to about 0.0005.

Traditionally, the jacketing materials normally employed in power cables comprise neoprene, PVC and PE over PS insulated cables, and polyvinyl chloride (PVC) over polyethylene insulated cables. According to this invention, not only is the polymer of the present invention suitable for the insulating and shielding layers, it may also be utilized in the jacket layer.

The electrically conductive member of the article of the present invention may generally comprise any suitable electrically conducting material, although generally electrically conducting metals are utilized. Preferably, the metals utilized are copper or aluminum. In power transmission, aluminum conductor/steel reinforcement (ACSR) cable, aluminum conductor/aluminum reinforcement (ACAR) cable, or aluminum cable is generally preferred.

EXAMPLES

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as : Me=methyl, Et=ethyl, n-Pr=normal-propyl, t-Bu=tertiary-butyl, Ph=phenyl, pfp=pentafluorophenyl, Cp=cyclopentadienyl, Ind=indenyl, Flu=fluorenyl, TMS=trimethylsilyl, TES=triethylsilyl and THF (or thf)=tetrahydrofuran.

All molecular weights are weight average molecular weight unless otherwise noted. Molecular weights (weight average molecular weight (Mw) and number average molecular weight (Mn) were measured by Gel Permeation Chromatography, unless otherwise noted, using a Waters 150 Gel Permeation Chromatograph equipped with a differential refractive index (DRI) and low angle light scattering (LS) detectors and calibrated using polystyrene standards. Samples were run in 1,2,4-trichlorobenzene (135° C.) using three Polymer Laboratories PC Gel mixed B columns in series. This general technique is discussed in "Liquid Chromatography of Polymers and Related Materials III'" J. Cazes Ed., Marcel Decker, 1981, page 207, the disclosure of which is incorporated herein by reference in its entirety. No corrections for column spreading were employed; however, data on generally accepted standards, e.g. National Bureau of Standards Polyethylene 1475, demonstrated a precision with 0.2 units for Mw/Mn which was calculated from elution times.

Cocatalyst Preparation

Example 1

Synthesis of 4-($C_6F_5NH$)—$C_6F_4Br$

To a suspension of sodium hydroxide (11 grams) in methyl sulfoxide (300 milliliters, DMSO) was added $C_6F_5NH_2$ (50 grams in 100 milliliters of DMSO). The mixture darkened immediately upon the addition of the amine. To this solution was added $C_6F_5Br$ (67 grams in 100 milliliters of DMSO). The mixture was stirred for 16 hours. The reaction mixture was added to 300 milliliters of diluted hydrochloric acid (HCl). To the quenched mixture was added 300 milliliters of diethyl ether (Et$_2$O). The two layers were separated. The aqueous layer was extracted a second time with 300 milliliters of diethyl ether. The purple ether layers are combined and dried with magnesium sulfate (MgSO$_4$). After an appropriate drying period the MgSO$_4$ was removed by filtration. The solvent was removed and the product was sublimed (oil bath temperature was 80-90° C., pressure was approximately 10$^{-4}$ millitorr). The white solid collected on the cold finger was crystallized from hexanes to afford a white crystalline solid. The product was characterized by $^{19}$F NMR. The yield was 24.56 grams of 4-(C$_6$F$_5$NH)—C$_6$F$_4$Br. $^{19}$F NMR (CDCl$_3$, 25° C., referenced from CFCl$_3$ (0.0)): δ –134.5; (m, 2F), –152.6; (d, 2F), –154.4; (d, 2F), –161.7; (t, 1F), –162.9; (q, 2F).

Example 2

Synthesis of 4-(C$_6$F$_5$N{TMS})-C$_6$F$_4$Br

To a potassium hydride (0.610 grams) suspension in tetrahydrofuran (50 milliliters, THF) was added a solution of 4-(C$_6$F$_5$NH)—C$_6$F$_4$Br (6.245 grams in 50 milliliters of THF). After the gas generation stopped, TMS-Cl (1.65 grams) was added. The solution was allowed to stir for 16 hours. The solid precipitate was separated by filtration and the THF was replaced with hexanes. The colorless liquid product was isolated from the yellow mixture by column chromatography (200 mesh silica gel, hexanes). This procedure yields 4.0 grams of product. The product was characterized by $^{19}$F NMR. $^{19}$F NMR (CDCl$_3$, 25° C., referenced from CFCl$_3$ (0.0)): δ –134.2; (m, 2F), –143.8; (m, 2F), –144.4; (m, 2F), –157.8; (t, 1F), –163.0; (m, 2F).

Example 3

Synthesis of [4-(C$_6$F$_5$N{TMS})-C$_6$F$_4$]$_4$B Li(Et$_2$O)$_{2.5}$

To a cold Et$_2$O solution of 4-(C$_6$F$_5$N{TMS})-C$_6$F$_4$Br (1.493 grams) was added n-butyllithium (2.0 milliliters, 2.1 M in hexanes, Aldrich). The lithiation mixture was allowed to stir over 2 hours at which point boron trichloride (0.77 milliliters, 1.0 M in hexanes, Aldrich) was added to the mixture. The cold bath was removed and the reaction was stirred for 3 hours. The white precipitate was separated by filtration. The volume of the filtrate was reduced to approximately 30% and pentane was added to induce precipitation. The two-layered mixture was chilled to –35° C. The product precipitates as a white solid (1.135 grams). The product was characterized by $^{19}$F and $^1$H NMR. $^1$H NMR (Toluene$_{d8}$, 25° C.): δ 3.25; (q, 10H), 1.09; (t, 15H), 0.11; (s, 36H). $^{19}$F NMR (Toluene$_{d8}$, 25° C.): δ –133.2; (m, 2F), –145.5; (m, 2F), –150.3; (m, 2F), –160.0; (t, 1F), –164.7; (m, 2F).

Example 4

Synthesis of [C$_6$H$_5$NMe$_2$(H)][4-(C$_6$F$_5$N{TMS})-C$_6$F$_4$]$_4$B

To a methylene chloride solution of [4-(C$_6$F$_5$N{TMS})-C$_6$F$_4$]$_4$B Li(Et$_2$O)$_{2.5}$ (2.121 grams) was added a methylene chloride solution of C$_6$H$_5$NMe$_2$HCl (0.185 grams). The mixture was stirred for 1 hour and the white precipitate was separated by filtration. The volume of the filtrate was reduced to 30% and pentane was added to induce precipitation. After chilling the mixture for 16 hours at –35° C., the product was collected by filtration and washed with cold pentane to afford 1.512 grams of product. The product was characterized by $^{19}$F and $^1$H NMR. $^{19}$F NMR (Toluene$_{d8}$, 25° C.): δ –133.7; (m, 2F), –145.6; (m, 2F), –149.3; (m, 2F), –159.3; (t, 1F), –164.2; (m, 2F). $^1$H NMR δ 6.82; (bm, 3H), 6.45; (bm, 2H), 2.13; (s, 6H), 0.07; (S, 36H).

Example 5

Synthesis of 4-(C$_6$F$_5$N{TES})-C$_6$F$_4$Br

To a potassium hydride (0.489 grams) suspension in tetrahydrofuran (50 milliliters, THF) was added a solution of 4-(C$_6$F$_5$NH)—C$_6$F$_4$Br (6.245 grams in 50 milliliters of THF). After the gas generation stopped, chlorotriethylsilane (TES-Cl, 1.65 grams) was added. The solution was allowed to stir for 16 hours. The solvent was replaced with hexanes and the solid precipitate was separated by filtration. The colorless liquid product was isolated from the yellow mixture by column chromatography (200 mesh silica gel, hexanes). This procedure yields 5.03 grams of product. The product was characterized by $^{19}$F NMR. $^{19}$F NMR (CDCl$_3$, 25° C., referenced from CFCl$_3$ (0.0)): δ –134.2; (m, 2F), –143.1; (m, 2F), –143.8; (m, 2F), —157.8; (t, 1F), –163.1; (m, 2F).

Example 6

Synthesis of [4-(C$_6$F$_5$N{TES})-C$_6$F$_4$]$_4$B Li(Et$_2$O)$_{2.5}$

To a cold Et$_2$O solution of 4-(C$_6$F$_5$N{TES})-C$_6$F$_4$Br (4.604 grams) was added n-butyllithium (4.2 milliliters, 2.1 M in hexanes, Aldrich). The lithiation was allowed to complete over 2 hours at which point boron trichloride (2.2 milliliters, 1.0 M in hexanes, Aldrich) was added to the reaction mixture. The cold bath was removed and the reaction was stirred for 3 hours. The white precipitate was separated by filtration. The volume of the filtrate was reduced to approximately 30% and pentane was added to induce precipitation. The two-layered mixture was chilled to –35° C. The product precipitates as a white solid (3.956 grams). The product was characterized by $^{19}$F and $^1$H NMR. $^1$H NMR (Toluene$_{d8}$, 25° C.): δ 3.27 (q, 10H), 1.13; (t, 15H), 0.83; (t, 36H), 0.69; (q, 24H). $^{19}$F NMR (Toluene$_{d8}$, 25° C.): δ –135.1; (m, 2F), –144.6; (m, 2F), –150.6; (m, 2F), –160.7; (t, 1F), –164.9; (m, 2F).

Example 7

Synthesis of [C$_6$H$_5$NBu$_2$(H)][4-(C$_6$F$_5$N{TES})-C$_6$F$_4$]$_4$B

To a methylene chloride solution of [4-(C$_6$F$_5$N{TES})-C$_6$F$_4$]$_4$B Li(Et$_2$O)$_{2.5}$ (1.618 grams) was added a methylene chloride solution of C$_6$H$_5$NBu$_2$HCl (0.200 grams). The mixture was stirred for 1 hour and the white precipitate was separated by filtration. The volume of the filtrate was reduced to 30% and pentane was added to induce precipitation. The solution was chilled for 16 hours at –35 ° C. The solvents were removed and the product was collected to afford 1.218 grams of product. The product was characterized by $^{19}$F and $^1$H NMR. $^{19}$F NMR (Toluene$_{d8}$, 25° C.): δ –133.2; (m, 2F), –144.6; (m, 2F), –149.0; (m, 2F), –159.3; (t, 1F), –164.3; (m, 2F). $^1$H NMR δ 6.88; (bm, 3H), 6.48; (bm, 2H), 2.95; (bs, 2H), 2.72; (bs, 2H), 1.25 (m, 4H), 1.50; (m, 4H), 0.80-0.07; (m, 66H).

Example 8

Synthesis of HC$_6$F$_4$OSi(iPr)$_3$

To a tetrahydrofuran (thf) solution of 2,3,5,6-tetrafluorophenol (5 grams) was added one equivalent of potassium hydride as a suspension in thf. The evolution of a gas was observed. After stirring for 1 hour, one equivalent of triisopropylchlorosilane was added. The reaction was allowed to stir for 16 hours. The solvent was replaced with pentane. The resulting precipitate byproduct was removed by filtration. The product was purified by column chromatography (silica gel, hexanes): yield=6.864 grams, 71%. $^1$H NMR (CDCl$_3$, 25° C.): δ 6.65; (m, 1H), 1.29; (hp, 3H), 1.09; (d, 18H). $^{19}$F NMR (CDCl$_3$, 25° C.): δ −142.4; (m, 2F), −159.1; (m, 2F).

Example 9

Synthesis of [Li(Et$_2$O)$_{2.5}$][B(C$_6$F$_4$OSi(iPr)$_3$)$_4$]

To a cold diethyl ether solution of HC$_6$F$_4$OSi(iPr)$_3$ (6.864 grams) was added one equivalent of BuLi (1.6 M, hexane). After stirring for 1 hour, one quarter of an equivalent of boron trichloride was added. The solution was allowed to reach room temperature slowly, and stirred for 16 hours. The LiCl was removed by filtration. The volume of the filtrate was reduced to approximately 30% and pentane added to induce precipitation. The mixture was chilled at −35° C. for 16 hours and the product collected by filtration (B[C$_6$F$_4$OSi(iPr)$_3$]$_4$Li (Et$_2$O)$_{2.5}$): yield=6.804 grams, 86%. $^1$H NMR (CDCl$_3$, 25° C.): δ 3.42; (q, 10H), 1.27; (hp, 12H), 1.15; (t, 15H), 1.05; (d, 72H). $^{19}$F NMR (CDCl$_3$, 25° C.): δ −135.9; (m, 2F), −163.8; (m, 2F).

Example 10

Synthesis of [C$_6$H$_5$N(Bu)$_2$H][B(C$_6$F$_4$OSi(iPr)$_3$)$_4$]

To a dichloromethane solution of (B[C$_6$F$_4$OSi(iPr)$_3$]$_4$Li (Et$_2$O)$_{2.5}$) (5.974 grams) was added one equivalent of C$_6$H$_5$N (Bu)$_2$HCl in dichloromethane. The reaction was stirred for 2 hours. The LiCl precipitate was collected by filtration and the solution volume was reduced to approximately 30%. Pentane was added to induce precipitation. The mixture was chilled to −35° C. for 16 hours. The product collected by filtration was [C$_6$H$_5$N(Bu)$_2$H ][B(C$_6$F$_4$OSi(iPr)$_3$)$_4$]: yield=5.488; grams, 91%. $^1$H NMR (Toluene-d$_8$, 25° C.): δ 7.29; (t, 2H), 7.12; (t, 1H), 6.88; (d, 2H), 3.15; (4H), 1.36-0.80; (m, 98H). $^{19}$F NMR (Toluene-d$_8$, 25° C.): δ −129.6; (d, 8F), −157.0; (d, 8F).

General Polymerization Procedure

Polymerizations were carried out in a stirred tank reactor with continuous flow of feeds to the system and continuous withdrawal of products. Solvent, including but not limited to hexanes, and monomers including but not limited to, ethylene, and alpha-olefins were purified over beds of alumna and/or mole sieves. Toluene for preparing catalyst solutions was also purified by the same technique. All feeds were pumped into the reactors by metering pumps, except for the ethylene and hydrogen that flowed as a gas through a mass flow meter/controller. Reactor temperature was controlled either by circulating water through a reactor cooling jacket, or by controlled chilling of the feeds and using the heat of polymerization to heat the reactor. The reactors were maintained at a pressure in excess of the vapor pressure of the reactant mixture to keep the reactants in the liquid phase. The reactors were operated liquid full.

Ethylene and alpha-olefin feeds were combined into one stream and then mixed with a prechilled hexane stream. A hexane solution of an alkyl aluminum scavenger was added to the combined solvent and monomer stream just before it entered the reactor to further reduce the concentration of any catalyst poisons. A mixture of the catalyst components in toluene was pumped separately to the reactor and entered through a separate port. The product of the reactor exited through a pressure control valve.

On the lab unit the pressure was reduced to atmospheric. Unconverted monomers in the solution were flashed off into the vapor phase in a vapor-liquid separator. The liquid phase was collected for polymer recovery. Polymer was recovered from solution by solvent evaporation under heat and vacuum. On the pilot unit polymer finishing included a concentration step, heat and vacuum stripping and pelletization.

Polymerization Examples

A series of polymerizations were carried out to demonstrate the process and products of this invention. The following examples are presented to illustrate the foregoing discussion. All parts, proportions and percentages are by weight unless otherwise indicated. Although the examples may be directed to certain embodiments of the present invention, they are not to be viewed as limiting the invention in any specific respect.

Example 11

Catalyst Activation

μ-(p-Et$_3$SiPh)$_2$C(Cp)(2,7di-t-BuFlu)HfMe$_2$ (110.0 mg, 0.1165 mmole), hereafter referred to as Catalyst A, was preactivated with N,N'-dimethylanilinium tetrakis (perfluoronaphthyl) borate [DMAH$^+$ B(pfn)$_4^-$] (119.0 mg, 0.1039 mmole), hereafter referred to as Activator B, in toluene (900 mL) under an inert atmosphere. This mixture was allowed to activate until the evolution of methane stopped (~5 min.), and then sealed for nitrogen pressure transfer to a delivery vessel. The catalyst solution was pumped to the reactor from the delivery vessel at a controlled rate using a calibrated HPLC pump.

Copolymer Synthesis

A mixture of chilled hexanes (5.4 L/h) was pumped into a 1 liter, liquid filled, stirred tank reactor while the reactor temperature was held constant using a steam/water mixture flowing through the reactor jacket. The pre-activated Catalyst A in toluene (0.060 L/h, 0.0078 mmole/h) and a scavenger solution of tri-n-octylaluminum in hexane (0.090 L/h, 0.3226 mmole/h) were then pumped to the reactor for 20 min before monomers were introduced. 1-Octene (0.732 L/h, 4.664 mole/h) was pumped to the chilled feed line as a liquid. Ethylene was delivered as a gas in a controlled fashion through a mass flow meter/controller (264.0 g/h, 9.429 mole/ h) and dissolved in the chilled solvent before entering the reactor. Hydrogen gas was delivered to the chilled feed line in a controlled manner through a mass flow meter/controller (0.103 g/h, 390 ppmw on ethylene) as needed for molecular weight control. Continuous flow was established at a constant temperature (130° C.) and stirring rate (~750 rpm). Onset of polymerization activity was determined by an observation of a viscous product and reduced steam heat needed to control reactor temperature. Once activity was established, one hour was provided to establish equilibrium conditions. The resulting mixture, containing mostly solvent, polymer (6.3 wt %), and unreacted monomers was collected (0.5 h) in a can containing an alcohol to quench the polymerization activity. A stabilizer was added to the polymer solution and mixed. The solvent was evaporated on a steam bath and the product dried under vacuum at 90° C. for 16 h. The resulting solid (143 g) was analyzed for composition by Fourier Transformation Infrared analysis (62.8 wt % ethylene FTIR, modified ASTM D-3900), for melt viscosity by Melt Index (3.4 g/10 min MI, ASTM D-1238, 190° C., 2.16 Kg), and by Melt Index Ratio (23.79 $I_{10}/I_2$) MIR, ASTM D-1238), and for an estimated density (0.8665 g/cc) by a modified ASTM D-1505.

Example 12

Catalyst Activation

μ-Me$_2$Si(Ind)$_2$HfMe$_2$ (0.544 g, 1.10 mmole), hereafter referred to as Catalyst B, was activated with N,N'-dimethylaniliniumtetrakis (perfluoronaphthyl) borate [DMAH$^+$ B(pfn)$_4^-$] (1.22 g, 1.07 mmole), hereafter referred to as Activator B. Each component was dissolved in toluene (4 L) under inert atmosphere. The catalyst and activator solutions were pumped to the reactor at a controlled rate using calibrated HPLC pumps and mixed in-line just prior to entering the reactor.

Copolymer Synthesis.

A mixture of hexanes (64 Kg/h) and a scavenger solution of tri-n-octylaluminum in hexane (0.3 Kg/h) were pumped into a 25 liter, liquid filled, stirred tank reactor for at least 20 min before monomers were introduced. Toluene solutions of catalyst and activator (0.165 L/h) were pumped separately to the reactors as described above. Propylene (6.15 Kg/h) was pumped to the solvent line as a liquid. Ethylene was delivered as a gas in a controlled fashion through a mass flow meter/controller (7.20 Kg/h) and dissolved in the solvent feed line before entering the reactor. After polymerization was established and equilibrium conditions met at the desired reactor temperature (132° C.), reactor samples were collected every 2 to 4 hours for analysis and adjustments made to the process to achieve the desired product properties. Reactor effluent was quenched, concentrated, stabilized, heated, and dried under vacuum in various finishing units. Finally, the product was pelletized and collected. The pellets were analyzed for composition by Fourier Transformation Infrared analysis (FTIR, 73.4 wt % ethylene, modified ASTM D-3900), for viscosity by Mooney Viscosity (25 ML, ASTM D-1646, 125° C., 4+1 min.) and Mooney Relaxation (90 MLR, ASTM D-1646).

Table 1 summarizes the run conditions and properties for the examples of this invention.

TABLE 1

Polymer Process Conditions and Product Properties.

| Example # | Used in Sample # | Type* | Catalyst Type[1] | Activator Type[2] | Comonomer Type | Run Temp. (C.) | Catalyst Efficiency (g/mmol) | Cement Conc[3] (%) or Prod. Rate (g/h) | Ethylene (wt %) | Density (g/cc) | Mooney (ML, 125 C., 1+4 min) | Melt Index (g/10 min) | $M_w \times 10^{-3}$ (Lalls)/MWD[4] |
|---|---|---|---|---|---|---|---|---|---|---|---|---|---|
| 11 | 30 | 1 | A | B | Octene | 130 | 35000 | 275 | 62.8 | 0.867 | 8.8 | 3.40 | |
| 12 | 34, 35, 36 | 2 | B | B | Propylene | 125 | 290000 | 7,380 | 73.4 | | 25 | | |
| 13 | 1 | 1 | A | A | Propylene | 100 | 18000 | 8.1 | 48.1 | | 5.7 | | |
| 14 | 2 | 1 | A | D | Propylene | 110 | 26000 | 6.7 | 73.5 | | 40 | | |
| 15 | 3 | 1 | A | E | Propylene | 100 | 22000 | 7.9 | 68.8 | | 28.3 | | |
| 16 | 4, 9, 25 | 1 | A | F | Propylene | 100 | 14000 | 6.4 | 73.5 | | 53.2 | | |
| 17 | 5, 10, 24 | 1 | A | F | Propylene | 100 | 14000 | 6.2 | 73.5 | | 51.4 | | |
| 18 | 6, 12, 23, 29 | | VZ/N | Al$_x$R$_y$X$_z$ | Propylene | 30 | 1000 | | 77 | | 25 | | 590/18.5 |
| 19 | 7, 13 | 1 | A | A | Propylene | 100 | 23000 | 8.9 | 69.5 | | 16.2 | | |
| 20 | 8 | 1 | A | B | Propylene | 117 | 26000 | 9.2 | 74.7 | | 44.8 | | |
| 21 | 11, 26 | 1 | A | C | Propylene | 110 | 28000 | 6.7 | 69.6 | | 32.9 | | |
| 22 | 14 | 2 | A | A | Octene | 100 | 33000 | 9,720 | 63.4 | | | 0.38 | |
| 23 | 15 | 1 | A | A | Propylene | 130 | 36000 | 332 | 69.2 | | 23.3 | | 123/2.12 |
| 24 | 16 | 2 | A | A | Octene | 142 | 56000 | 10,600 | 65.1 | | | 0.71 | |
| 25 | 17 | 2 | A | A | Octene | 138 | 64000 | 10,200 | 68.8 | | | 0.32 | |
| 26 | 18 | 2 | A | A | Octene | 140 | 78000 | 9,770 | 67.1 | | | 0.88 | |
| 27 | 19 | 1 | A | A | Butene | 130 | 92000 | 7.0 | 72.9 | 0.869 | 21 | 0.71 | 134/2.02 |
| 28 | 20 | 2 | A | A | Octene | 130 | 98000 | 9,890 | 65.8 | | | 0.26 | |
| 29 | 21 | 2 | A | A | Octene | 110 | 119000 | 11,190 | 64.3 | | | 0.31 | |
| 30 | 22 | 2 | A | A | Octene | 90 | 145000 | 9,860 | 65.6 | | | 0.24 | |
| 31 | 27 | 1 | A | G | Butene | 130 | 14000 | 166 | 80.7 | 0.882 | 108 | 0.65 | 318/1.91 |
| 32 | 28 | 1 | A | H | Butene | 130 | 30000 | 179 | 80.7 | 0.884 | 79 | 0.11 | 222/1.98 |
| 33 | 31 | 1 | A | B | Butene | 130 | 52000 | 301 | 75.2 | 0.870 | 82 | 1.39 | 253/1.91 |
| 34 | 32 | 2 | A | B | Octene | 128 | 94,000 | 7,220 | 72 | | | 1.80 | |
| 35 | 33 | 2 | B | B | Propylene | 135 | 185000 | 7,830 | 73.5 | | 27.4 | | |

*1 indicates a product made following a proceedure most similar to the description of Example 11 and 2 indicates one most similar to example 12
[1]Catalyst A is bis(para-triethylsilyl-phenyl) methylene (2,7-(di-tert-butyl) fluorenyl)(cyclopentadienyl) hafnium dimethyl
[1]Catalyst B is rac μ-dimethylsilyl bis-indenyl hafnium dimethyl
[1]Catalyst VZ/N indicates use of a Vanadium based Ziegler-Natta transition metel catalyst and an Aluminum alkyl halide as co-catalyst
[2]Activator description given in Table 10
[3]Cement Concentration is the weight percent of solid copolymer in solution Testing for Dielectric Tan Delta I. Preparation of Polymers: Copolymerizations of ethylene and propylene were carried out in a 2 liter, continuous reactor operating at 100° C. The catalyst precursor used was bis(indenyl)dimethylsilyl hafnium dimethyl. In all cases the polymerization solvent was hexanes, while the activation solvent was toluene. Standard runs using $[B(C_6F_5)_4]$ $[C_6H_5NMe_2H]$ as the activating cocatalyst were carried out prior to each experiment. Trioctylaluminium was used as the scavenger in all runs (25% wt). The scavenger-catalyst mole ratios for these reactions were less than 10. The polymers were precipitated with isopropyl alcohol and dried in a vacuum oven at 75° C. The NCAs used in the cocatalyst were prepared according to the procedures described in Examples 1-10.

II. Sample Preparation for Testing: Polymer samples were compounded in a typical medium voltage cable compound, known in the industry as Compound 3728 (see Table 3 below for composition). A 300 cc Brabender mixer was used for compounding. The batch weight was 250 g. A conventional mixing procedure (polymer first, followed by clay and rubber chemicals) was used. The total mixing time was seven minutes. The clay was added in three stages at different intervals for effective incorporation. The dump or discharge temperature was 120° C. The compounds discharged from the mixer were sheeted out on a two roll mill. The peroxide curatives were added on the mill and ingested into the compound. Polymer samples were also compounded in a commercial, proprietary compound (Okoguard®, available from Okonite). Additionally, some polymers were also tested neat. Neat data was obtained by crosslinking pads at 165° C. for 20 minutes. This was accomplished by adding antioxidant (Agerite® MA, 0.5 phr) and peroxide (DiCup® R, 2.6 phr) on a two-roll mill.

III. Testing Procedure: The wet electrical properties, tan delta, were obtained over an extended period of time (90 days) by continuous immersion in 90° C. water. A 600 volt AC source at 60 Hz frequency was applied on the cured samples. The test procedure was ASTM D150-95, the disclosure of which is expressly incorporated herein by reference in its entirety for purposes of U.S. patent practice. Briefly, the test was performed on solid slabs of cured polymer that had been cut into disks having a diameter of 2.5 inch and a thickness of about 75 mils. The measuring cell was a Tettex Model test cell and a Tettex Model 2822 Capacitance Bridge was used. Prior to testing, both sides of the sample were cleaned with isopropyl alcohol. The results obtained are summarized below in Tables 6-9 for the 3728 compound, in Table 5 for the Okoguard® compound and in Table for the neat polymer. In each of these Tables the tan delta values for a commercial polymer frequently used for medium voltage power cable insulation (Vistalon® 1703P, available from ExxonMobil Chemical) are also given. Vistalon® 1703P is a conventional EP(D)M synthesized with Ziegler-Natta catalysts. Polymer attributes are: 77 wt. % ethylene, 0.9 wt. % vinyl norbornene, remainder propylene. Mooney Viscosity [(1+4)@125° C.]=25.

The dielectric dissipation factor is defined as follows:

$$\tan \delta = \text{loss current/charging current} = \in''/\in'$$

wherein $\in'$ is the real (storage) part of the dielectric constant known simply as the dielectric constant and $\in''$ is the imaginary (loss) part of the dielectric constant known as the loss factor or loss index. The dissipation factor is commonly employed as a direct measure of the dielectric loss.

The data in Tables 4-9 show that polymers prepared with catalyst systems comprising bulky noncoordinating anions according to the invention show much better dielectric loss and, thus, insulation properties than a conventionally employed NCA such as tetrakis(pentafluorophenyl) borate.

TABLE 3

Medium Voltage Cable Compound 3728

| Ingredient | Description | Formulation[1] |
|---|---|---|
| Polymer | | 100 |
| Translink[R] 37 | Surface-Treated Calcined Clay | 60 |
| Drimix[R] A-172 | Vinyl Silane | 1.0 |
| ERD[R] 90 | Red Lead | 5.0 |
| Agerite[R] MA | Antioxidant | 1.5 |
| Escorene[R] LD 400 | Low Density Polyethylene | 5.0 |
| Paraffin 1236 | Wax | 5.0 |
| Zinc Oxide | | 5.0 |
| DiCup[R] 40KE | Dicumyl Peroxide (40% active) | 6.5 |

[1]parts per hundred polymer

TABLE 4

Tan Delta Data[5] for Metallocene Ethylene Elastomer Grades in 3728 Cable Compound

| Sample | 1 | 2 | 3 | 4 | 5 | 6[3] |
|---|---|---|---|---|---|---|
| Catalyst Precursor[1,2] | Mc1 | Mc1 | Mc1 | Mc1 | Mc1 | Z/N |
| NCA[4] | A* | D | E | F | F | |
| Catalyst Efficiency (g polymer/ mmol Mc) | 18,000 | 26,000 | 22,000 | 14,000 | 14,000 | |
| 0 Days | 0.0039 | 0.0046 | 0.0031 | 0.0034 | 0.0035 | 0.0034 |
| 1 Day | 0.0236 | 0.0154 | 0.0099 | 0.0100 | 0.0085 | 0.0076 |
| 7 Days | 0.0269 | 0.0121 | 0.0115 | 0.0109 | 0.0093 | 0.0069 |
| 14 Days | 0.0314 | 0.0106 | 0.0123 | 0.0114 | 0.0097 | 0.0063 |
| 21 Days | 0.0349 | 0.0093 | 0.0128 | 0.0113 | 0.0097 | 0.0055 |
| 28 Days | 0.0394 | 0.0086 | 0.0132 | 0.0113 | 0.0100 | 0.0050 |
| 90 Days | 0.0669 | 0.0075 | 0.0171 | 0.0132 | 0.0115 | 0.0042 |

[1]Mc1 = bis(3,5-triethylsilyl)phenylmethylene cyclopentadienyl fluorenyl hafnium dimethyl
[2]Mc2 = dimethylsilylene bis(indenyl) hafnium dimethyl
[3]Vistalon[R] 1703P
[4]see Table 10 for structures
[5]according to ASTM D150-95 Z/N = Ziegler–Natta

TABLE 5

Tan Delta Data[5] for Metallocene Ethylene Elastomer Grades in Commercial Okoguard[R] Medium Voltage Insulation Compound

| Sample | 7 | 8 | 9 | 10 | 11 | 12[3] |
|---|---|---|---|---|---|---|
| Catalyst Precursor[1,2] | Mc1 | Mc1 | Mc1 | Mc1 | Mc1 | Z/N |
| NCA[4] | A* | B | F | F | C | |
| Catalyst Efficiency (g polymer/mol Mc) | 23,000 | 26,000 | 14,000 | 14,000 | 28,000 | |
| 0 Days | 0.0060 | 0.0036 | 0.0061 | 0.0058 | 0.0044 | 0.0064 |
| 1 Day | — | 0.0342 | 0.0433 | 0.0400 | 0.0454 | 0.0440 |
| 7 Days | 0.1114 | 0.0372 | 0.0297 | 0.0258 | 0.0505 | 0.0187 |
| 14 Days | 0.1147 | 0.0423 | 0.0282 | 0.0234 | 0.0554 | 0.0124 |
| 21 Days | 0.1164 | 0.0466 | 0.0278 | 0.0222 | 0.0581 | 0.0102 |

[1]Mc1 = bis(3,5-triethylsilyl)phenylmethylene cyclopentadienyl fluorenyl hafnium dimethyl
[2]Mc2 = dimethylsilylene bis(indenyl) hafnium dimethyl
[3]Vistalon[R] 1703P
[4]see Table 10 for structures
[5]according to ASTM D150-95 Z/N = Ziegler–Natta

TABLE 6

Tan Delta Data[5] for Neat Metallocene-Catalyzed Ethylene Elastomer Grades

| Sample | 13 | 14 | 15 | 16 | 17 | 18 |
|---|---|---|---|---|---|---|
| Catalyst[1,2] | Mc1 | Mc1 | Mc1 | Mc1 | Mc1 | Mc1 |
| NCA[4] | A* | A* | A* | A* | A* | A* |
| Catalyst Efficiency (g polymer/mol Mc) | 23,000 | 33,000 | 36,000 | 56,000 | 64,000 | 78,000 |
| 0 Days | 0.0030 | 0.0001 | 0.0001 | 0.0002 | 0.0001 | 0.0002 |
| 1 Day | 0.0279 | 0.0195 | 0.0095 | 0.0254 | 0.0225 | 0.0143 |
| 7 Days | 0.0456 | 0.0116 | 0.0170 | 0.0109 | 0.0098 | 0.0084 |
| 14 Days | 0.0444 | 0.0143 | 0.0200 | 0.0121 | 0.0108 | 0.0114 |
| 21 Days | 0.0459 | 0.0158 | 0.0202 | 0.0125 | 0.0116 | 0.0124 |
| 28 Days | 0.0463 | 0.0180 | 0.0262 | 0.0135 | 0.0125 | 0.0137 |
| 60 Days | 0.0531 | 0.0255 | 0.0341 | 0.0159 | 0.0143 | 0.0171 |

[1]Mc1 = bis(3,5-triethylsilyl)phenylmethylene cyclopentadienyl fluorenyl hafnium dimethyl
[2]Mc2 = dimethylsilylene bis(indenyl) hafnium dimethyl
[3]Vistalon[R] 1703P
[4]see Table 10 for structures
[5]according to ASTM D150-95 Z/N = Ziegler–Natta

TABLE 7

Tan Delta Data[5] for Neat Metallocene-Catalyzed Ethylene Elastomer Grades

| Sample | 19 | 20 | 21 | 22 | 23[3] |
|---|---|---|---|---|---|
| Catalyst[1,2] | Mc1 | Mc1 | Mc1 | Mc1 | Z/N |
| NCA[4] | A* | A* | A* | A* | |
| Catalyst Efficiency (g polymer/mol Mc) | 92,000 | 98,000 | 119,000 | 145,000 | |
| 0 Days | 0.0007 | 0.0002 | 0.0002 | 0.0001 | 0.0004 |
| 1 Day | 0.0058 | 0.0132 | 0.0127 | 0.0124 | 0.0002 |
| 7 Days | 0.0084 | 0.0060 | 0.0066 | 0.0053 | 0.0003 |
| 14 Days | 0.0100 | 0.0060 | 0.0065 | 0.0063 | 0.0002 |
| 21 Days | 0.0100 | 0.0063 | 0.0068 | 0.0063 | 0.0003 |
| 28 Days | 0.0117 | 0.0070 | 0.0073 | 0.0067 | 0.0003 |
| 60 Days | 0.0136 | 0.0075 | 0.0080 | 0.0083 | 0.0003 |

[1]Mc1 = bis(3,5-triethylsilyl)phenylmethylene cyclopentadienyl fluorenyl hafnium dimethyl
[2]Mc2 = dimethylsilylene bis(indenyl) hafnium dimethyl
[3]Vistalon[R] 1703P
[4]see Table 10 for structures
[5]according to ASTM D150-95 Z/N = Ziegler–Natta

TABLE 8

Tan Delta Data[5] for Neat Metallocene-Catalyzed Ethylene Elastomer Grades

| Sample | 24 | 25 | 26 | 27 | 28 | 29[3] |
|---|---|---|---|---|---|---|
| Catalyst[1,2] | Mc1 | Mc1 | Mc1 | Mc1 | Mc1 | Z/N |
| NCA[4] | F | F | C | G | H | |
| Catalyst Efficiency (g polymer/mol Mc) | 14,000 | 14,000 | 28,000 | 14,000 | 30,000 | |
| 0 Days | 0.0003 | 0.0002 | 0.0003 | 0.0003 | 0.0003 | 0.0004 |
| 1 Day | 0.0124 | 0.0117 | 0.0041 | 0.0014 | 0.0037 | 0.0002 |
| 7 Days | 0.0188 | 0.0173 | 0.0081 | 0.0014 | 0.0058 | 0.0003 |
| 14 Days | 0.0182 | 0.0165 | 0.0117 | 0.0018 | 0.0077 | 0.0002 |
| 21 Days | 0.0181 | 0.0167 | 0.0140 | 0.0018 | 0.0079 | 0.0003 |
| 28 Days | 0.0184 | 0.0166 | 0.0166 | 0.0034 | 0.0061 | 0.0003 |
| 90 Days | 0.0190 | 0.0161 | 0.0200 | 0.0029 | 0.0161 | 0.0003 |

[1]Mc1 = bis(3,5-triethylsilyl)phenylmethylene cyclopentadienyl fluorenyl hafnium dimethyl
[2]Mc2 = dimethylsilylene bis(indenyl) hafnium dimethyl
[3]Vistalon[R] 1703P
[4]see Table 10 for structures
[5]according to ASTM D150-95 Z/N = Ziegler–Natta

TABLE 9

Tan Delta Data[5] for Neat Metallocene-Catalyzed Ethylene Elastomer Grades

| Sample | 30 | 31 | 32 | 33 | 34 | 35 | 36 |
|---|---|---|---|---|---|---|---|
| Catalyst[1,2] | Mc1 | Mc1 | Mc1 | Mc2 | Mc2 | Mc2 | Mc2 |
| NCA[3] | B | B | B | B | B | B | B |
| Catalyst Efficiency (g polymer/mol Mc) | 35,000 | 52,000 | 94,000 | 185,000 | 290,000 | 290,000 | 290,000 |
| 0 Days | 0.0003 | 0.0006 | 0.0004 | 0.0005 | 0.0005 | 0.0002 | 0.0002 |
| 1 Day | 0.0013 | 0.0014 | 0.0007 | 0.0004 | 0.0004 | 0.0008 | 0.0005 |
| 7 Days | 0.0026 | 0.0013 | 0.0014 | 0.0011 | 0.0006 | 0.0005 | 0.0010 |
| 14 Days | 0.0035 | 0.0017 | 0.0012 | 0.0006 | 0.0005 | 0.0005 | 0.0006 |
| 21 Days | 0.0036 | 0.0018 | 0.0014 | 0.0010 | 0.0011 | 0.0011 | 0.0010 |
| 28 Days | 0.0038 | 0.0019 | 0.0014 | 0.0005 | 0.0006 | 0.0007 | 0.0008 |
| 60 Days | 0.0044 | 0.0028 | 0.0015 | 0.0006 | 0.0008 | 0.0011 | 0.0010 |

[1]Mc1 = bis(3,5-triethylsilyl)phenylmethylene cyclopentadienyl fluorenyl hafnium dimethyl
[2]Mc2 = dimethylsilylene bis(indenyl) hafnium dimethyl
[3]Vistalon[R] 1703P
[4]see Table 10 for structures
[5]according to ASTM D150-95 Z/N = Ziegler–Natta

TABLE 10

Structures of Non-Coordinating Anions

| NCA | NCA Structure |
|---|---|
| A | $[B(C_6F_5)_4]^-$ |
| B | $[B(C_6F_4(C_6F_5))_4]^-$ (tetrakis(perfluorobiphenyl)borate, fused) |
| C | $[B(C_6F_4\text{-}C_6F_5)_4]^-$ |
| D | $[B(C_6F_4\text{-}N(C_6F_5)Si(CH_3)_3)_4]^-$ |
| E | $[B(C_6F_4\text{-}N(C_6F_5)Si(CH_2CH_3)_3)_4]^-$ |
| F | $[B(C_6F_4\text{-}OSi(CH(CH_3)_2)_3)_4]^-$ |

TABLE 10-continued

Structures of Non-Coordinating Anions

| NCA | NCA Structure |
|---|---|
| G | $[B(C_6H_4-C_6H_4F)_4]^\ominus$ |
| H | $[(C_6H_4F)_3Al-N(C_4H_4)N-Al(C_6H_4F)_3]^\ominus$ |

While certain representative embodiments and details have been provided to illustrate the invention, it will be apparent to skilled artisans that various process and product changes from those disclosed in this specification may be made without departing from this invention's scope, which the appended claims define. These are considered to be within the scope of the current invention. Furthermore, certain features or elements are described in the disclosure (i.e. specification and claims as filed). All combinations of these elements or features are within the invention's scope to the extent that the combinations do not conflict with the disclosure taken as a whole.

All patents, test procedures, and other documents cited in this specification are fully incorporated by reference to the extent that this material is consistent with this specification and for all jurisdictions in which such incorporation is permitted.

All documents to which priority is claimed are fully incorporated by reference for all jurisdictions in which such incorporation is permitted.

Certain invention features are described as numerical ranges or upper limits or lower limits. The invention specifically encompasses values of those features that fall between any of the specifically mentioned upper or lower limits unless otherwise indicated.

The specification and claims as filed disclose different aspects of the invention. The individual components or elements may be combined in any novel combination, regardless of whether the claims recite each individual combination, and remain within Applicants' intended disclosure.

What is claimed is:

1. A composition suitable for electrical insulation purposes, the composition comprising at least 30% by weight, based on the composition, of at least one polymer comprising a catalyst residue, the catalyst comprising an unsupported non-polymeric noncoordinating anion having at least 33 atoms Z that are different from hydrogen and fluorine atoms, wherein the composition shows a dielectric tan delta after 14 days in water at 90° C., as determined by ASTM D 150-95, of less than 0.015, based on a catalyst efficiency of 10,000 g polymer/mmol transition metal.

2. The composition of claim 1, wherein the composition comprises at least one additional polymer not made by a noncoordinating anion containing catalyst.

3. The composition of claim 2, wherein the composition comprises at least 50% by weight of the at least one polymer.

4. The composition of claim 3, wherein the composition shows a dielectric tan delta of less than 0.013.

5. An olefinic polymer comprising a residue of a transition metal catalyst, the catalyst comprising an unsupported non-polymeric noncoordinating anion having at least 33 atoms Z that are different from hydrogen and florine atoms, wherein the polymer has a dielectric tan delta after 14 days in water at 90° C., as determined by ASTM D 150-95, of less than 0.02, based on a catalyst efficiency of 10,000 g polymer/mmol transition metal.

\* \* \* \* \*